(12) United States Patent
Lee et al.

(10) Patent No.: US 11,569,686 B2
(45) Date of Patent: Jan. 31, 2023

(54) ELECTRONIC DEVICE FOR WIRELESSLY CHARGING EXTERNAL DEVICE

(71) Applicant: SAMSUNG ELECTRONICS CO., LTD., Suwon-si (KR)

(72) Inventors: Juhyang Lee, Suwon-si (KR); Kyungmin Park, Suwon-si (KR); Yusu Kim, Suwon-si (KR); Hyundeok Seo, Suwon-si (KR); Hyunho Lee, Suwon-si (KR); Byungyeol Choi, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 16/794,649

(22) Filed: Feb. 19, 2020

(65) Prior Publication Data

US 2020/0266667 A1 Aug. 20, 2020

(30) Foreign Application Priority Data

Feb. 19, 2019 (KR) .................. 10-2019-0019558

(51) Int. Cl.
*H02J 50/12* (2016.01)
*H02J 7/00* (2006.01)
*H02J 50/00* (2016.01)

(52) U.S. Cl.
CPC ............ *H02J 50/12* (2016.02); *H02J 7/0071* (2020.01); *H02J 7/00714* (2020.01); *H02J 50/005* (2020.01)

(58) Field of Classification Search
USPC ....................................................... 320/108
See application file for complete search history.

(56) References Cited

U.S. PATENT DOCUMENTS

| 8,547,057 B2 | 10/2013 | Dunworth et al. |
| 8,853,995 B2 | 10/2014 | Von Novak et al. |

(Continued)

FOREIGN PATENT DOCUMENTS

| EP | 3133746 A1 | 2/2017 |
| KR | 10-2018-0078726 A | 7/2018 |

(Continued)

OTHER PUBLICATIONS

International Search Report and Written Opinion dated Jun. 16, 2020 in counterpart International Application No. PCT/KR2020/002348.

(Continued)

*Primary Examiner* — Bryce M Aisaka
(74) *Attorney, Agent, or Firm* — Nixon & Vanderhye P.C.

(57) ABSTRACT

An electronic device includes a display, a conductive coil, a wireless charging circuit electrically connected to the conductive coil, a power management circuit, a battery; and a processor, wherein the processor may be configured to control the electronic device to: measure a current flowing from the power management circuit to the wireless charging circuit while power is transferred to an external device through the conductive coil, and adjust the power transferred to the external device through the conductive coil based on a part of a power amount preset in a signal requesting addition of power based on a value of the current being between a first threshold value and a second threshold value greater than the first threshold value.

15 Claims, 14 Drawing Sheets

(56) References Cited

U.S. PATENT DOCUMENTS

| | | |
|---|---|---|
| 9,502,909 B2 | 11/2016 | El-Maleh et al. |
| 9,531,441 B2 | 12/2016 | Bae |
| 9,531,444 B2 | 12/2016 | Bae |
| 9,537,539 B2 | 1/2017 | Bae |
| 9,680,313 B2 | 6/2017 | Grilli et al. |
| 10,014,723 B2 | 7/2018 | Huang et al. |
| 10,454,308 B2 * | 10/2019 | Kwon .................... H02J 50/80 |
| 10,516,285 B2 | 12/2019 | Pawar et al. |
| 2010/0207575 A1 * | 8/2010 | Pijnenburg .............. H02J 50/10 |
| | | 320/108 |
| 2010/0323616 A1 | 12/2010 | Von Novak et al. |
| 2012/0242160 A1 | 9/2012 | Tseng |
| 2015/0022149 A1 | 1/2015 | Bae |
| 2015/0137611 A1 | 5/2015 | Huang et al. |
| 2016/0294220 A1 | 10/2016 | Kwon et al. |
| 2016/0352134 A1 | 12/2016 | Pawar et al. |
| 2017/0054328 A1 | 2/2017 | Jung et al. |
| 2018/0123379 A1 | 5/2018 | Ha et al. |
| 2019/0356156 A1 | 11/2019 | Wan et al. |
| 2020/0028376 A1 | 1/2020 | Ha et al. |
| 2020/0044487 A1 | 2/2020 | Kwon et al. |

FOREIGN PATENT DOCUMENTS

| | | |
|---|---|---|
| KR | 10-2020-0047061 | 5/2020 |
| WO | 2013/089311 | 6/2013 |
| WO | WO 2018-184578 A1 | 11/2018 |

OTHER PUBLICATIONS

Extended European Search Report dated Jan. 20, 2022 for EP Application No. 20759838,4.

* cited by examiner

ELECTRONIC DEVICE FOR WIRELESSLY CHARGING EXTERNAL DEVICE

CROSS-REFERENCE TO RELATED APPLICATION

This application is based on and claims priority under 35 U.S.C. § 119 to Korean Patent Application No. 10-2019-0019558, filed on Feb. 19, 2019, in the Korean Intellectual Property Office, the disclosure of which is incorporated by reference herein its entirety.

BACKGROUND

1. Field

The disclosure relates to a method of wirelessly transferring power to an external device and an electronic device supporting the same.

2. Description of Related Art

An electronic device such as a smartphone or a tablet PC may include an internal battery charged through an external power source. Recently, an electronic device have been released, which supports a wireless charging method in which power is wirelessly supplied through an internal coil as well as a wired charging method in which power is supplied through a wire. The wired charging scheme may be a method in which a user charges a battery by directly connecting a travel adapter (TA) and a charging device through a connector. The wireless charging method may be a method in which power is transferred between a coil inside a wireless charging pad and a coil inside the electronic device when a user places the electronic device on the wireless charging pad.

Recently, a technology for wirelessly transferring power between terminals has been developed. For example, when the rear case of a device having a high battery level and the rear case of a device having a low battery level are in close contact with each other, power may be wirelessly transferred between the devices.

In the case of transferring power wirelessly between electronic devices according to the prior art, the maximum amount of power that can be output from a power supply circuit (e.g., PMIC) inside the first electronic device that transfers power may be determined at a design stage (e.g., about 7.5 W). When the amount of power required by the wireless charging circuit (e.g., MFC IC) inside the first electronic device exceeds the maximum amount of power that can be provided by the power management circuit (e.g., PMIC), the protection circuit inside the power management circuit operates to wirelessly charge the battery. You will not be able to power the circuit. In this case, wireless charging disconnection occurs.

For example, when the arrangement state of the first electronic device and the second electronic device is not suitable for wireless charging (for example, miss-aligned), or the outer case of the first electronic device or the second electronic device is relatively thick. The amount of power required by the second electronic device may increase. In response to this, the amount of power required by the wireless charging circuit (e.g., MFC IC) inside the first electronic device is increased, and wireless charging may be interrupted.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure is to provide an electronic device stably supporting device-to-device wireless charging based on a current flowing from a power supply circuit to a wireless charging circuit.

In accordance with an example aspect of the disclosure, an electronic device may include: a display having at least a portion of the display viewable through a first surface of the electronic device, a conductive coil disposed between the display and a second surface opposite the first surface in the electronic device, a wireless charging circuit electrically connected to the conductive coil, a power management circuit connected to the wireless charging circuit, a battery connected to the power management circuit, and a processor operatively connected to the display and the power management circuit. The processor may be configured to control the electronic device to measure a current flowing from the power management circuit to the wireless charging circuit while power is transferred to an external device through the conductive coil, and may adjust the power transferred to the external device through the conductive coil based on a part of a power amount preset in a signal requesting addition of power based on a value of the current being between a first threshold value and a second threshold value higher than the first threshold value.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
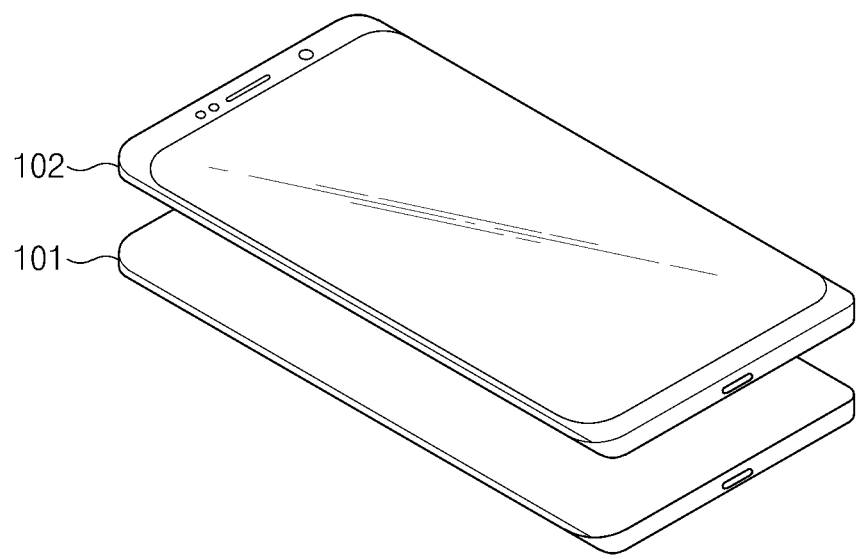
FIG. 1 is a diagram illustrating example wireless power transfer between devices according to various embodiments.

FIG. 1 is a diagram illustrating example wireless power transfer between devices according to various embodiments. Hereinafter, a description will be given based on a case where a first electronic device 101 is a device (TX device) that transfers wireless power, and a second electronic device 102 is a device (RX device) that receives wireless power, but the disclosure is not limited thereto.

Referring to FIG. 1, the first electronic device 101 may charge the second electronic device 102 through wireless power transfer. For example, when a battery 223 (see, e.g., FIG. 2) of the second electronic device 102 is discharged or a remaining battery level is less than or equal to a specified value, a rear case of the first electronic device 101 and a rear case of the second electronic device 102 may be disposed to be in contact with each other or spaced from each other within a specified distance (e.g., within about 0.5 cm), the first electronic device 101 may wirelessly supply power to the second electronic device 102. The second electronic device 102 may charge a battery in the second electronic device 102 using power wirelessly received.

For example, when a current flows through a first conductive coil in the first electronic device 101, an induced current may flow through the second conductive coil in the second electronic device 102. The battery in the second electronic device 102 may be charged by the induced current.

According to various embodiments, the first electronic device 101 may adjust the power transferred wirelessly to the second electronic device 102 based on a variety of information such as, for example, and without limitation, whether an external power source is connected, a device type of the second electronic device 102, identification information, a signal received from the second electronic device 102, or the like.

Although a case where the second electronic device 102 is a smartphone is illustrated as an example In FIG. 1, the disclosure is not limited thereto. For example, the second electronic device 102 may be a wearable device such as a smart watch, but the disclosure is not limited thereto.

Figure 2:
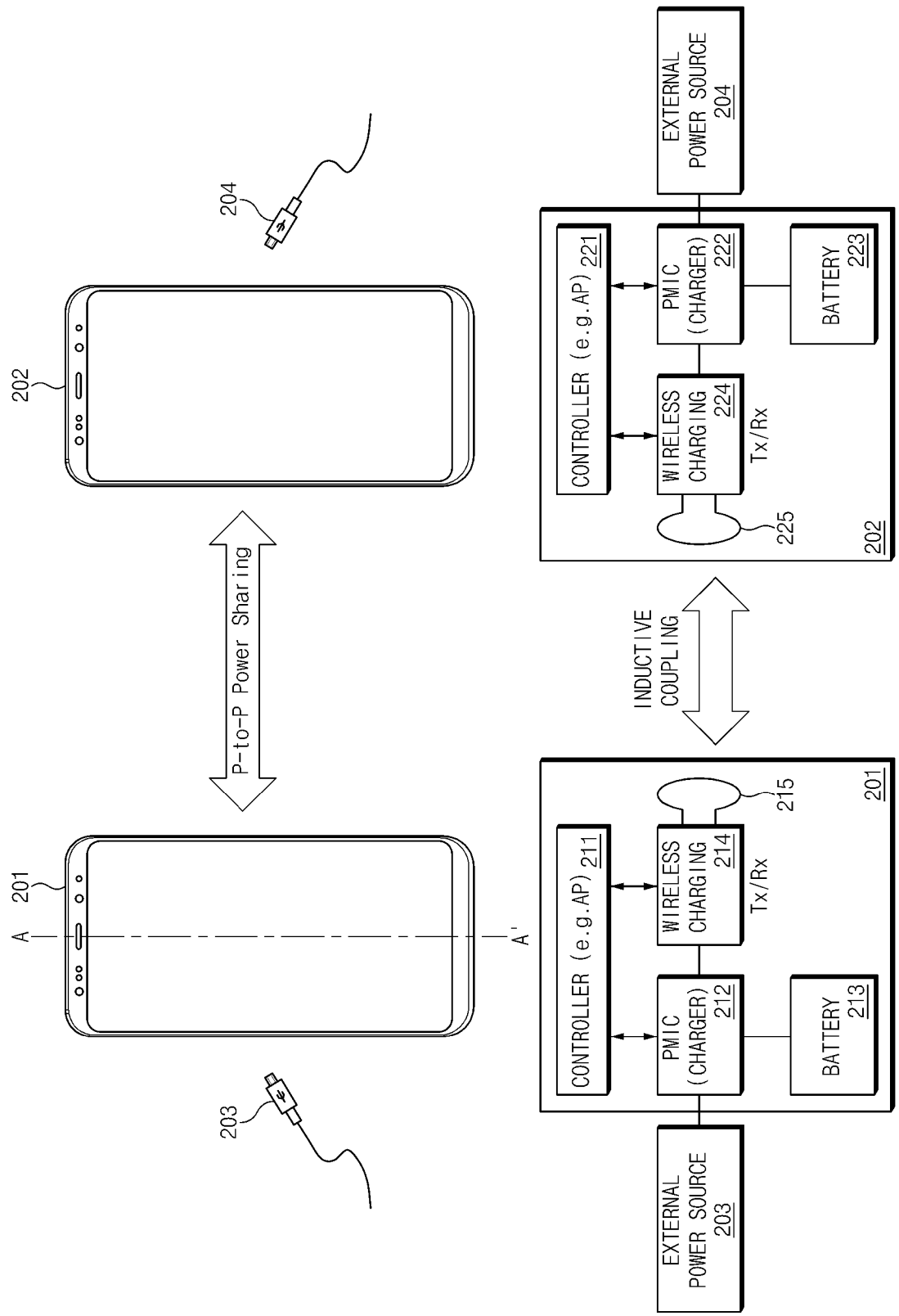
FIG. 2 is a diagram illustrating example power sharing wirelessly between a first electronic device and a second electronic device according to various embodiments.

FIG. 2 is a diagram illustrating example sharing power wirelessly between a first electronic device and a second electronic device. Although both the first electronic device 201 and the second electronic device 202 are described as devices capable of transferring/receiving wireless power in FIG. 2, one of the two devices may be an electronic device capable of only receiving wireless power.

In the present disclosure, description will be given under the assumption that the first electronic device 201 is a host device and the second electronic device 202 is an external electronic device, but the second electronic device 202 may have the same configuration as the first electronic device 201 or a configuration in which only the wireless power transfer function is removed, and the disclosure is not limited thereto.

Operations or functions of a controller (e.g., including processing circuitry) 211, a power management circuit 212, a battery 213, a wireless charging circuit 214, and/or a coil 215 of the first electronic device 201 may be the same or similar to operations or functions of a coil 225, a wireless charging circuit 224, a PMIC 222 (power management IC), a battery 223 or a controller (e.g., including processing circuitry) 221 (controller) of the second electronic device 202.

According to an example, the first electronic device 201 may include the controller 211, the power management circuit 212, the battery 213, the wireless charging circuit 214, and/or the coil 215. The first electronic device 201 may be wired to an external device through an external connection terminal 203 (e.g., USB).

According to an embodiment, the coil 215 may be spirally formed in an FPCB. According to an example, the wireless charging circuit 214 may include a full bridge circuit. For example, the wireless charging circuit 214 may perform control such that the full bridge circuit is driven as an inverter (DC→AC) in a wireless power transfer operation, and the full bridge circuit is driven as a rectifier (AC→DC) in a wireless power reception operation.

According to an embodiment, the wireless charging circuit 214 may exchange pieces of information necessary for wireless power transfer with the second electronic device 202 through, for example, in-band communication according to the WPC standard. For example, the in-band communication may refer, for example, to a scheme in which data may be exchanged between the first electronic device 201 and the second electronic devices 202 by modulating a frequency or amplitude of a wireless power transmit signal in the case of wireless power transfer between the coil 215 and the coil 215. According to various embodiments, as communication between the first electronic device 201 and the second electronic device 202, out-band communication may be used. For example, the out-band communication is different from wireless power signal and may be short-range communication such as, for example, and without limitation, Near Field Communication (NFC), Bluetooth, WiFi, or the like.

According to an example, the power management circuit (e.g., PMIC 212) may include, for example, and without limitation, a charger function of charging the battery 213 through wired and wireless input power, a function of performing communication (e.g., the USB battery charging specification, USB power delivery (PD) communication, AFC communication, and/or quick charge (QC) communication) with an external power source (e.g., travel adapter) connected to a USB terminal, a function of supplying required power to a system, supplying power corresponding to a voltage level necessary for each terminal, and/or a function of supplying power to the wireless charging circuit 214 in a wireless power transfer mode, or the like.

According to an embodiment, the external connection terminals 203 and 304 may be terminals complying, for example, with the USB standard. For example, the external connection terminals 203 and 304 may be interfaces for USB charging and/or on the go (OTG) power supply. According to an embodiment, the external connection terminals 203 and 304 may be connected to an external power source (TA, battery pack, or the like).

According to an example, the controller 211 may include various processing circuitry and integrally control, for example, and without limitation, wired and wireless charging of the first electronic device 101, USB communication with the second electronic device 202, and/or communication (e.g., USB PD, BC1.2 (battery charging (revision) 1.2), AFC, and/or QC) with the second electronic device 202, or the like, according to a situation of the first electronic device 101. For example, the BC1.2 or PD may be an interface for communicating with an external power source (TA), and the controller 211 may control communication with the external power source. For example, a situation of the first electronic device 201 may include, for example, and without limitation, a temperature of the first electronic device 201 and/or a capacity of the battery 213 of the first electronic device 201, etc.

According to various embodiments, the first electronic device 201 may operate in a wireless power transmission mode (Tx mode) using the battery 213. When a wired power supply device is connected, the first electronic device 201 may preferentially use the external power source in a wireless power transmission mode (Tx mode) and charge the battery 213 with remaining power.

In this disclosure, the operation of the electronic device (e.g., the first electronic device 201 of FIG. 2) in the wireless power transmission mode (Tx mode) may refer, for example, to the electronic device transferring power to an external electronic device (e.g., the second electronic device 202 of FIG. 2) using the coil 215. In this disclosure, the operation of the electronic device (e.g., the second electronic device 202 of FIG. 2) in the wireless power reception mode (Rx mode) may refer, for example, to the electronic device (e.g., the second electronic device 202 of FIG. 2) receiving wireless power from an external electronic device (e.g., the first electronic device 201 of FIG. 2) through the coil 225 and charging the battery 223 using the received wireless power.

According to various embodiments, when wirelessly supplying power to the second electronic device 202, the first electronic device 201 may compare a current flowing from the power management circuit 212 in the first electronic device 201 to the wireless charging circuit 214 with a plurality of threshold values and set an environment related to wireless power transmission. According to an embodiment, the plurality of threshold values may be set based on the maximum allowable current value set for device protection in the power management circuit 212 (see FIGS. 5, 6, 7A, 7B, 7C, 8, 9, 10, 11 and 12).

Figure 3:
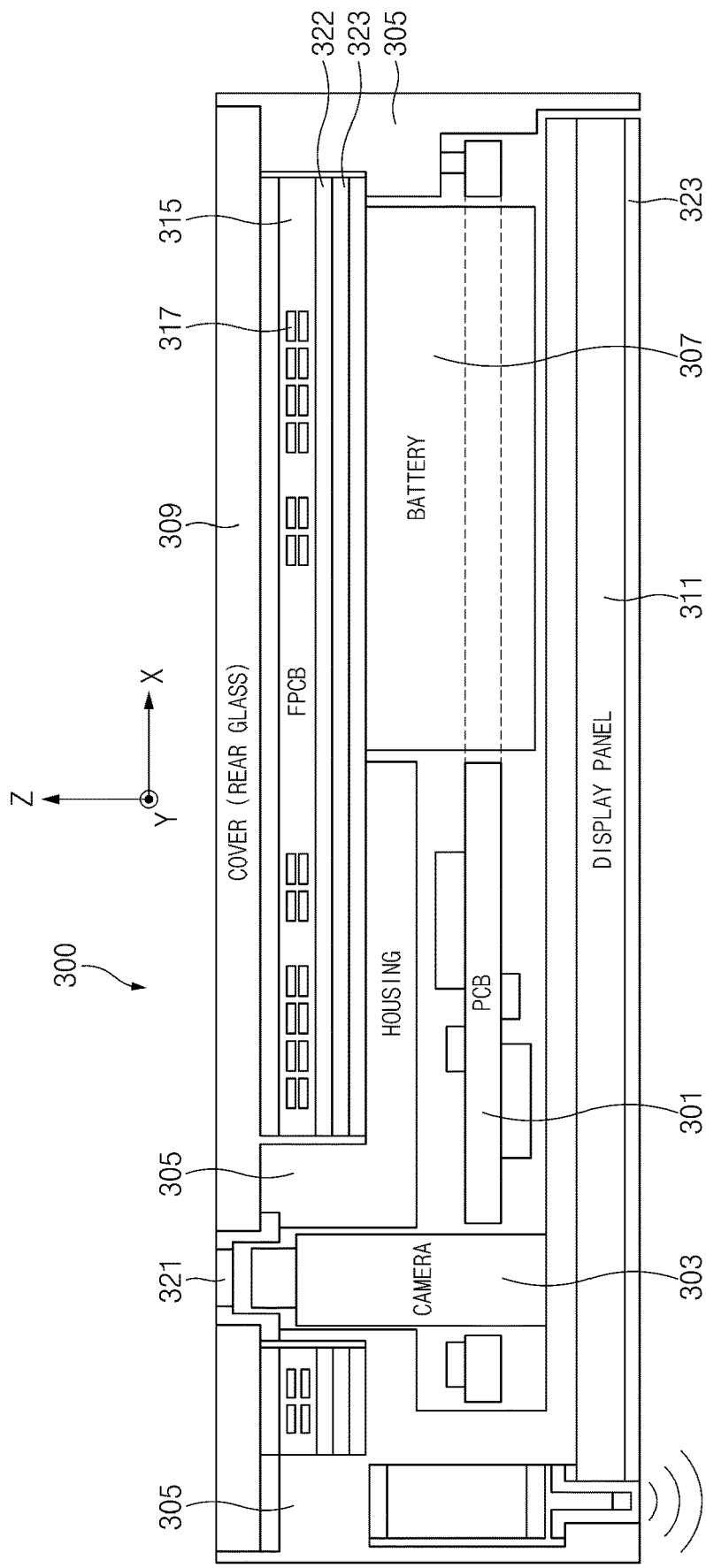
FIG. 3 is a cross-sectional view illustrating an example electronic device according to various embodiments.

FIG. 3 is a cross-sectional view illustrating an example electronic device according to various embodiments. FIG. 3 is a cross-sectional view taken along line A-A' of the first electronic device 201 shown in FIG. 2.

Referring to FIG. 3, an electronic device 300 (e.g., the electronic device 101 or the second electronic device 102 of FIG. 1) may include a housing 305 that accommodates and fixes one or more components, a cover 309 fastened to the housing 305 on the rear side of the electronic device 300. For example, the components may include a display panel 311, a substrate 301, a battery 307, a camera 303, and/or an FPCB 315 located inside the housing 305.

According to an example, the display panel 311 may be disposed on a front surface of the electronic device, and a glass (window cover) 323 may be attached to the top surface thereof. According to an embodiment, the display panel 311 may be integrally formed with a touch sensor or a pressure sensor. According to another embodiment, the touch sensor or the pressure sensor may be separated from the display panel 311. For example, the touch sensor may be disposed between the glass 323 and the display panel 311.

According to an example, the substrate 301 may include components such as, for example, and without limitation, a communication module or a processor mounted thereon. According to an example, the substrate 301 may be implemented using at least one of a printed circuit board (PCB) or a flexible printed circuit board (FPCB). According to an example, the substrate 301 may operate as a ground plate capable of grounding a loop antenna 317.

According to an example, the cover 309 may be divided into a conductive region including a conductive material and a nonconductive region including a nonconductive material. For example, the cover 309 may be divided into the conductive region and the nonconductive region located on one side or both sides of the conductive region. According to an example, at least one opening 321 may be formed in the cover 309 to expose some components of the electronic device 300 to the outside. For example, the cover 309 may include one or more openings 321 for the camera 303, a flash, or a sensor (e.g., a fingerprint sensor), etc., but the disclosure is not limited thereto.

According to an example, the FPCB 315 may be attached to a bottom of the cover 309. According to an example, the FPCB 315 may be equipped with one or more loop antennas 317 and may be positioned to be electrically insulated from the conductive region of the cover 309.

According to an example, the one or more loop antennas 317 may be the same type as each other. For example, the one or more loop antennas 317 may be a planar type coil. According to another embodiment, some of the one or more loop antennas 317 may be a planar type coil and the other some may be a solenoid type coil.

According to an example, the one or more loop antennas 317 may include a wireless charging coil, and the wireless charging coil may be in a spiral pattern.

According to an example, magnetic-field shielding layers (a shielding sheet 322 and a graphite sheet 323) may be provided in one direction of one or more loop antennas 317. For example, the magnetic-field shielding layers 322 and 323 may concentrate the direction of the magnetic field caused by the coil in the back direction of the electronic device 300 (e.g., Z direction in FIG. 3), and suppress formation of the magnetic field in the electronic device 300 to prevent and/or reduce abnormal operation of other electronic components.

Figure 4:
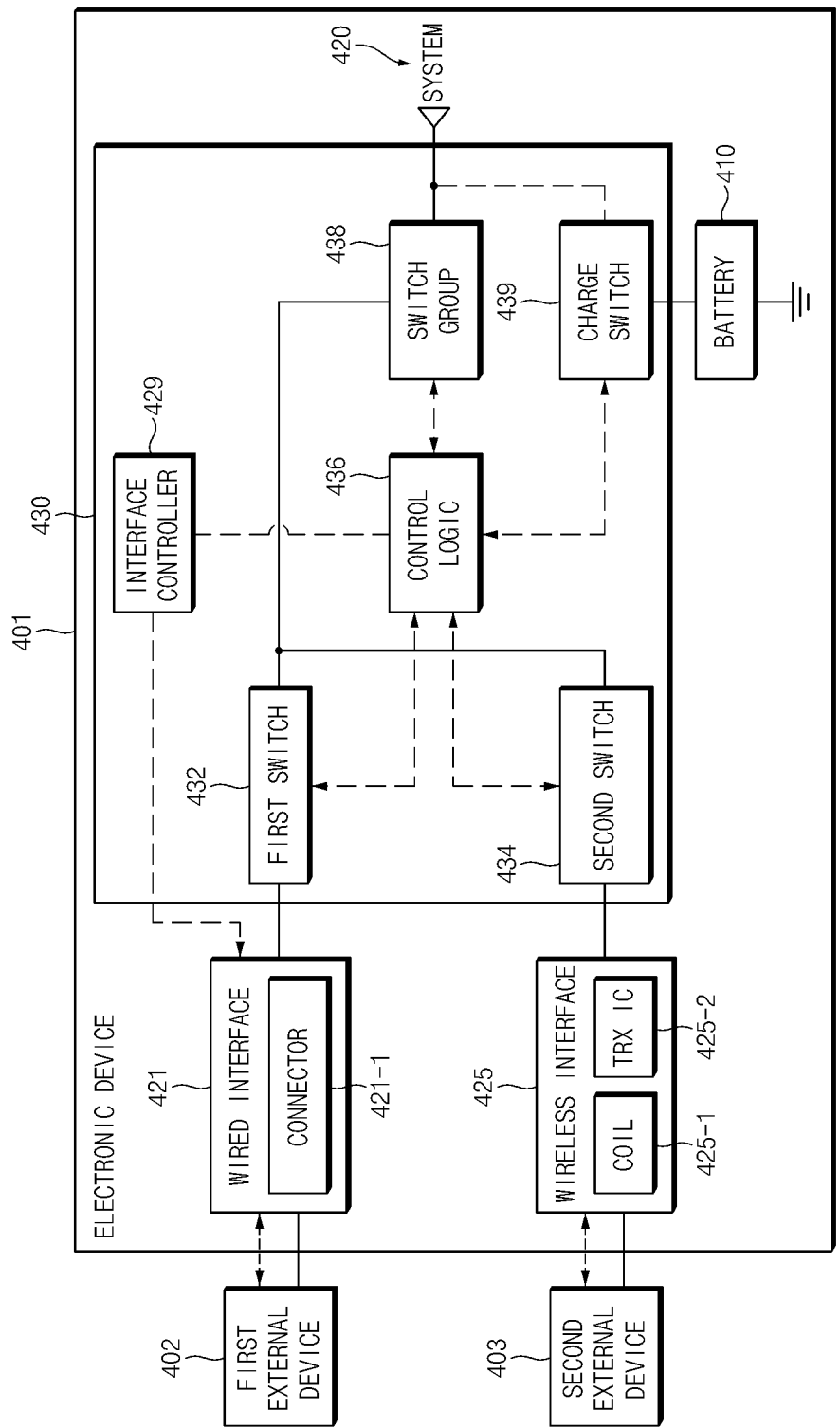
FIG. 4 is a block diagram illustrating an example configuration of a charging circuit in an electronic device according to various embodiments.

FIG. 4 is a block diagram illustrating an example configuration of a charging circuit in an electronic device according to various embodiments.

Referring to FIG. 4, an electronic device 401 (e.g., the electronic device 101 of FIG. 1) according to various embodiments may include a battery 410, a system 420, a wired interface 421, a wireless interface 425, and/or a charging circuit 430.

According to an example, the battery 410 may be mounted in a housing (e.g., the housing 305 of FIG. 3) of the electronic device 401, and may be chargeable. The battery 410 may include, for example, a lithium-ion battery, a rechargeable battery, and/or a solar battery, or the like, but is not limited thereto.

According to an example, the wired interface 421 and the wireless interface 425 may be mounted on a part of the housing of the electronic device 401, and may be connected to external devices individually. The wired interface 421 may include, for example, a universal serial bus (USB) connector 421-1, and may be wired to a first external device 402 through the connector 421-1. The wired interface 421 may be an interface for USB charging and/or on-the-go (OTG) power supply, or may be connected to an external power source (a TA, a battery pack, or the like). The wireless interface 425 may include a coil 425-1 (also referred to as a 'conductive pattern') (e.g., one or more loop antennas 317 of FIG. 3) and a TRX IC (transmit/receive integrated chip) 425-2, and transfer and receive power wirelessly with a second external device 403 through the conductive pattern 425-1 and the TRX IC 425-2. Wireless power may be transferred and received using, for example, and without limitation, a magnetic field inductive coupling method, a resonance coupling method, a wireless power transfer method into which the two methods are mixed, or the like. According to an example, the conductive pattern 425-1 may include a first conductive pattern for transferring wireless power and a second conductive pattern for receiving wireless power.

According to an example, the first external device 402 may be an external device that is externally connectable wiredly, and may be a wired power supply device or a wired power receiving device. The wired power receiving device may be an on-to-go (OTG) device. The OTG device may be a device connected to the electronic device 401 to receive power, such as a mouse, a keyboard, a USB memory, and an accessory. In this case, the electronic device 401 may operate in an OTG mode in which external power is supplied to a USB terminal.

The wired power supply device may be a device connected to the electronic device 401 wiredly to supply power to the electronic device 401, such as a travel adapter (TA). The wired power receiving device may be connected to the electronic device wiredly to receive power from the electronic device and use the power as an internal power source, and may charge another battery included in the wired power receiving device.

According to an example, the first external device 402 connected to the electronic device 401 through the wired interface 421 may include a wired high voltage (HV) device (e.g., a device supporting USB power delivery (PD), adaptive fast charge (AFC), or quick charge (QC)). When the wired HV device is connected to a connector, the electronic device 401 may supply power of a voltage (e.g., 9v) higher than the voltage (e.g., 5v) supplied from the battery 410 to the wired HV device or receive the power from the wired HV device.

According to an example, the second external device 403 may include a wireless power supply device or a wireless power receiving device. According to various embodiments, the wireless power supply device may include a device for supplying wireless power to an electronic device using a first conductive pattern, such as a wireless charging pad. The wireless power receiving device may include a device for receiving wireless power supplied from the electronic device using a second conductive pattern and charging another battery included in the wireless power receiving device using the received power.

According to an example, the second external device 403 connected to the electronic device 401 through the wireless interface 425 may include a wireless high voltage (HV) device (e.g., a device supporting USB power delivery (PD), adaptive fast charge (AFC), or quick charge (QC)). According to an example, the wireless HV device may include a wireless charging pad that supports fast charging. The wireless charging pad may determine whether to perform fast charging or determine whether to perform fast charging using a separate communication module (Bluetooth or Zigbee) by communicating with the TRX IC 425-2 through in-band communication. For example, the electronic device 401 may request the wireless charging pad to perform charging at a high voltage (HV) of, for example, 9V through the TRX IC 425-2, and the wireless charging pad may determine whether fast charging is possible through communication with the electronic device 401 at a request for the HV charging from the electronic device 401. When it is determined that fast charging is possible, the wireless charging pad may supply power to the electronic device 401 based on 9V.

According to an example, the charging circuit 430 may be electrically connected to the battery 410, and may connect the wired interface 421 and the wireless interface 425, the battery 410 and the wired interface 421, and the battery 410 and the wireless interface 425.

The charging circuit 430 may be configured to electrically connect the battery 410 and the coil 425-1 (e.g., the first conductive pattern) to wirelessly transfer power to a second external device (e.g., a wireless power receiving device) and, at the same time, electrically connect the battery 410 and a connector to wiredly transfer power to a first external device (e.g., a wired power receiving device). For example, the charging circuit 430 may convert first power generated by the battery 410 into second power higher than the first power, transfer third power that is at least a part of the second power to the wireless power receiving device via the coil 425-1 (e.g., the first conductive pattern), and transfer fourth power that is at least another part of the second power to the OTG device or the wired power receiving device via the connector.

According to an example, the charging circuit 430 may include an interface controller 429, a first switch 432, a second switch 434, a control logic 436, a switch group 438, and/or a charge switch 439.

According to an example, the interface controller 429 may include various controlling/processing circuitry and determine a type of the first external device 402 connected to the wired interface 421, and determine whether fast charge is supported through adaptive fast charge (AFC) communication with the first external device 402. According to an example, the interface controller 429 may include a micro USB interface IC (MUIC) or a fast charge (e.g., USB power delivery (PD), adaptive fast charge (AFC), or quick charge (QC) interface. For example, the MUIC may determine whether the first external device 402 connected to the wired interface 421 is a wired power supply device or a wired power receiving device. For example, the fast charge interface may determine whether fast charge is supported through communication with the first external device 402. When fast charge is supported, the first external device 402 may increase transmit and receive power. For example, the first external device 402 may be a wired power supply device that typically transfers power of 10 W (about 5V/2 A) and, when fast charge is supported, transfers power of 15 W (about 9V/1.6V).

According to an example, a first switch 432 may include at least one switch and control output of power to a device (e.g., OTG device) connected through the wired interface 421 or a wired power device and input of power from the wired power supply device. For example, the first switch 432 may operate in an on state such that power is output to the OTG device or the wired power receiving device and is input from the wired power supply device, or may operate in an off state such that power is not output to the OTG device or the wired power receiving device and is not input from the wired power supply device.

According to an example, a second switch 434 may include at least one switch, and control power input and output with respect to the wireless power supply device and the wireless power receiving device through the wireless interface 425, for example, the conductive pattern 425-1 and the TRX IC 425-2. For example, the second switch 434 may operate in an on state such that power is input and output with respect to the wireless power supply device or the wireless power receiving device or may operate in an off state such that power is input and output with respect to the wireless power supply device or the wireless power receiving device.

According to an example, a control logic 436 may perform control to convert power input from at least one of the first switch 432 and the second switch 434 into a charging voltage and a charging current suitable for charging the battery 410, perform control to convert power from the battery 410 into a charging voltage and a charging current suitable for charging an external device (e.g., the first external device 402 or the second external device 403) connected to each of the first switch 432 and the second switch 434, or perform control to convert power from the battery 410 into a voltage and a current suitable for use in an external device.

According to various embodiments, the control logic 436 may perform a charging current sensing function, a charging cut off function, a CC loop (constant current loop) function, a CV loop (constant voltage loop) function, a termination current loop function, a recharging loop function, and/or a bat to Sys FET Loop function. The charging current sensing function may include a function of detecting a charging current amount. The charging cut off function may include a function of stopping charging of the battery 410 in the case of overcharging or overheating. The CC loop function may include a function of controlling a constant current (CC) section in which the charging current is kept constant. The CV loop function may include a function of controlling a constant voltage (CV) section in which the charging voltage is kept constant. The termination current loop function may include a function of controlling termination of charging. The recharging loop function may include a function for controlling recharge. The Bat to Sys (battery to system) FET loop function may include a function of controlling a voltage and a current between the battery 410 and the system.

According to various embodiments, the control logic 436 may perform control such that the charging circuit 430 selectively transfers power by the battery 410 to the outside wirelessly or wiredly. The control logic 436 may also perform control such that power is transferred to the first external device 402 and/or the second external device 403 through the charging circuit 430, or power is received from the first external device 402 and/or the second external device 403.

According to various embodiments, the control logic 436 may perform control such that the battery 410 is charged using power received from a wired power supply device when the wired power supply device is connected. In addition, the control logic 436 may perform control to perform the OTG function when an OTG device is connected. In addition, the control logic 436 may perform control such that the battery 410 is charged by receiving power from a wireless power supply device when the wireless power supply device is connected. In addition, the control logic 436 may perform control to perform the OTG function simultaneously while charging the battery by receiving power from the wireless power supply device when the wireless power supply device and the OTG device are connected. In addition, the control logic 436 may perform control such that power is supplied to the wireless power receiving device by using power of the battery 410 when the wireless power receiving device is connected. In addition, when the wired power supply device and the wireless power receiving device are connected, the control logic 436 may perform control to receive power from the wired power supply device to charge the battery 410 and simultaneously supply power to the wireless power receiving device. In addition, the control logic 436 may perform control to perform an OTG function and simultaneously supply power to the wireless power receiving device using power of the battery when the OTG device and the wireless power receiving device are connected.

According to an example, the switch group 438 may boost or buck provide power of the battery 410 to provide a constant current to a system (e.g., the system 420 that supplies power to each module of the electronic device), or provide a constant current to a connected external device, or boost or buck a charging voltage to provide a constant charging current to the battery 410. According to an example, the switch group 438 may include a buck/boost converter.

According to an example, the charge switch 439 may detect a charging current amount, and may cut off charging of the battery 410 when overcharging or overheating occurs.

According to an example, the electronic device 401 may include a display (not shown). The display may display a user interface configured to control at least a part of the charging circuit 430. The display may receive a user input for transferring power from the battery 410 to an external device wirelessly or wiredly. The display may display at least one or more external devices connected to the electronic device 401, may display a battery remaining capacity of the connected external device, or may display an indication of whether power is being supplied from the connected external device or is being received from the connected external device. The display may display a screen for controlling distribution of power provided to the plurality of external devices when a plurality of external devices are connected and power is supplied to each of the plurality of external devices and display a screen for selecting power provision priorities of the plurality of external devices. In addition, the display may display a screen representing information on the display of the connected external device. At least a part of the content displayed on the display may be changed according to a signal received from the connected external device.

Figure 5:
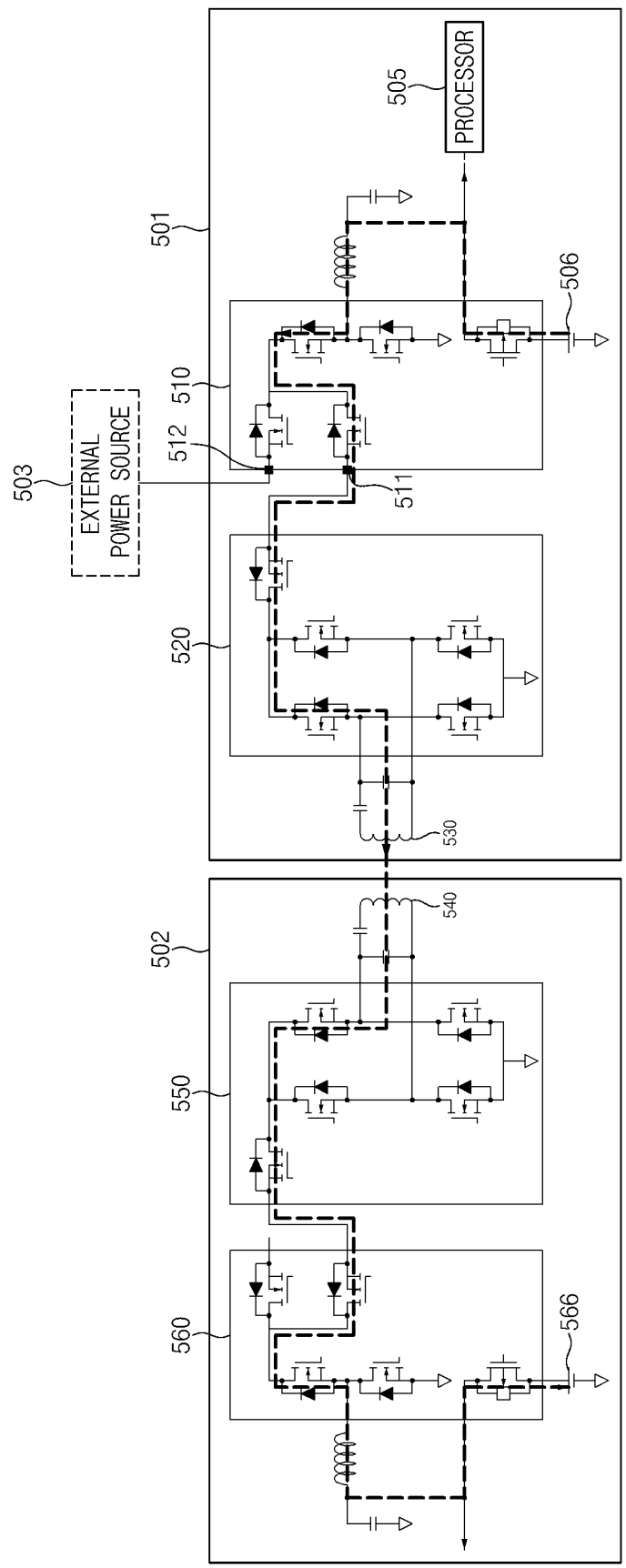
FIG. 5 is a circuit diagram illustrating example wireless charging of each of a first electronic device and a second electronic device, according to various embodiments.

FIG. 5 is a circuit diagram illustrating example wireless charging of each of a first electronic device and a second electronic device, according to various embodiments. FIG. 5 is illustrative and the disclosure is not limited thereto.

Referring to FIG. 5, a first electronic device 501 (e.g., the first electronic device 101 of FIG. 1) may include a processor (e.g., including processing circuitry) 505, a battery 506, a first power management circuit 510 (e.g., the power management circuit 212 in FIG. 2), a first wireless charging circuit 520 (e.g., the wireless charging circuit 214 of FIG. 2), and a first conductive coil 530 (e.g., the coil 215 of FIG. 2).

A second electronic device 502 (e.g., the second electronic device 102 of FIG. 1) may include a second conductive coil 540 (e.g., the coil 225 of FIG. 2), a second wireless charging circuit 550 (e.g., the wireless charging circuit 224 of FIG. 2), a second power management circuit 560 (e.g., the power management circuit 222 of FIG. 2), and a battery 566.

According to an example, the first power management circuit 510 may convert the power of the battery 506 into power required by the first wireless charging circuit 520 and transfer the required power to the first wireless charging circuit 520. The first power management circuit 510 may supply power to the first wireless charging circuit 520 through a wireless power terminal 511. The wireless power terminal 511 may be applied with a specified charging voltage Vout, and may be set such that a charging current Iout flows to be within a specified maximum allowable current value based on the specified charging voltage Vout. The maximum allowable current value may be a value set to protect the first power management circuit 510. When the charging current Iout exceeding the maximum allowable current value flows, the first power management circuit 510 may block the charging current Iout. Due to this, device-to-device wireless charging may be stopped. The maximum allowable current value may be set to various values in consideration of characteristics of the first electronic device 501, characteristics of the second electronic device 502, power transfer conditions, and the like.

According to various embodiments, when an external power source 503 may be connected to an external power terminal 512, the first power management circuit 510 may charge the battery 506. In an example, the first power management circuit 510 may transfer a part of power transferred through the external power source 503 to the second electronic device 502 through wireless power transfer, and the other part of the power may be charged in the battery 506 or used in the first electronic device 501.

The first wireless charging circuit 520 may transfer power to the second conductive coil 540 of the second electronic device 502 through the first conductive coil 530. When a current flows through the first conductive coil 530, an induced current may flow through the second conductive coil 540. Power may be transferred to the second wireless charging circuit 550 and the second power management circuit 560 by the induced current, and the battery 566 may be charged.

Figure 6:
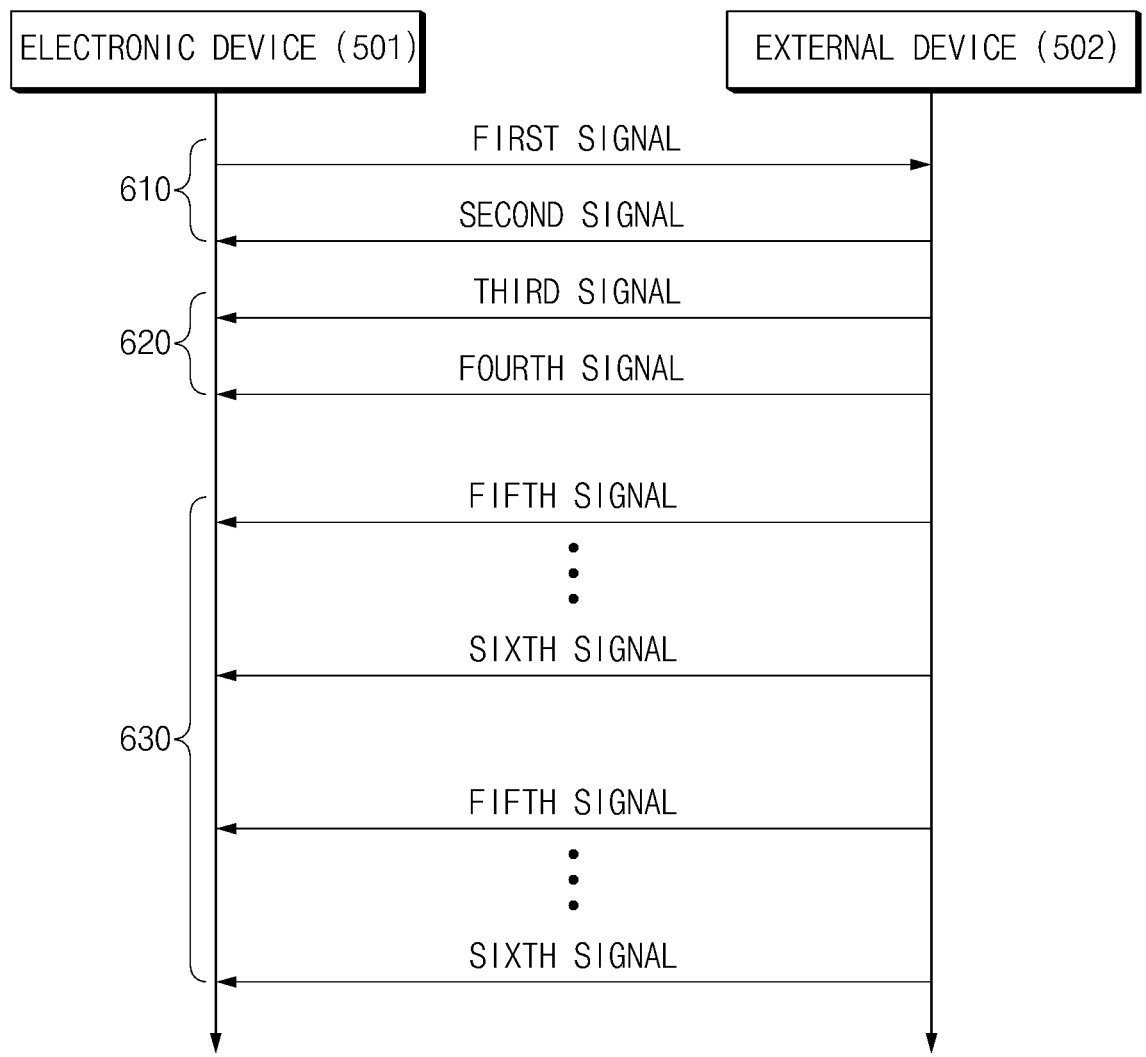
FIG. 6 is a signal flow diagram illustrating example operations of an electronic device and an external device according to various embodiments.

FIG. 6 is a signal flow diagram illustrating example wireless charging between a first electronic device and a second electronic device according to various embodiments. FIG. 6 is a diagram illustrating an example operation sequence of the first electronic device 501 and the second electronic device (e.g., an external electronic device) 502 shown in FIG. 5 in greater detail. Hereinafter, communication between the first electronic device 501 and the second electronic device 502 may be a signal transmission method (in-band method) through a coil of each of the devices supporting wireless charging, but the disclosure is not limited thereto.

Referring to FIG. 6, the first electronic device 501 and the second electronic device 502 may enter a first step (hereinafter referred to as device detection step) 610. The device detection step may be a step (e.g., a "ping phase") in which the first electronic device 501 is to detect the second electronic device 502 before a wireless power transfer process is started.

In the device detection step, the first electronic device 501 may transmit a first signal for detecting the second electronic device 502 to the second electronic device 502. For example, the first signal may be a "digital ping". The second electronic device 502, which has received the first signal, may transmit a second signal for starting a wireless charging protocol to the first electronic device 501. For example, the second signal may be a "signal strength packet (SSP)". The SSP may be a packet indicating the presence of the second electronic device 502 in response to the digital ping. The SSP may include a value indicating a degree of inductive coupling between conductive coils of the two electronic devices.

When the wireless charging process is started in response to the second signal transmitted by the second electronic device 502, the first electronic device 501 and the second electronic device 502 may enter a second step (hereinafter, referred to as a device identification step) 620. The device identification step 620 may be a step (e.g., "identification and configuration phase") in which the first electronic device 501 is to identify the second electronic device 502. In the device identification step, the second electronic device 502 may transmit a third signal which is a signal related to the identification of the second electronic device 502, and a fourth signal which is a signal related to power settings of the second electronic device 502, to the first electronic device 501. For example, the third signal may be an "identification packet" (e.g., a WPC version, Power Receiver Manufacturer Codes (PRMC), and product codes), and the fourth signal may be a "configuration packet" (e.g., power class or maximum power). The first electronic device 501 may set settings for wireless power transfer based on the received third and fourth signals.

When the second electronic device 502 is identified and recognized, the first electronic device 501 and the second electronic device 502 may enter a third step (hereinafter, referred to as a power transfer step) 630. The power transfer step 630 may be a step in which the first electronic device 501 is to wirelessly transfer power to the second electronic device 502 (e.g., a "power transfer phase").

In the power transfer step 630, the second electronic device 502 may transmit a fifth signal requesting an increase or decrease in power to be transferred and a sixth signal representing a value of power received by the second electronic device 502 to the first electronic device 501. For example, the fifth signal may be a "control error packet (CEP)". When the first electronic device 501 receives the fifth signal, the first electronic device 501 may adjust a transmit (Tx) power amount in response to the fifth signal. The sixth signal may be a "received power packet". The sixth signal may be information about power received by the second electronic device 502 through the wireless power transfer process.

Figure 7A:
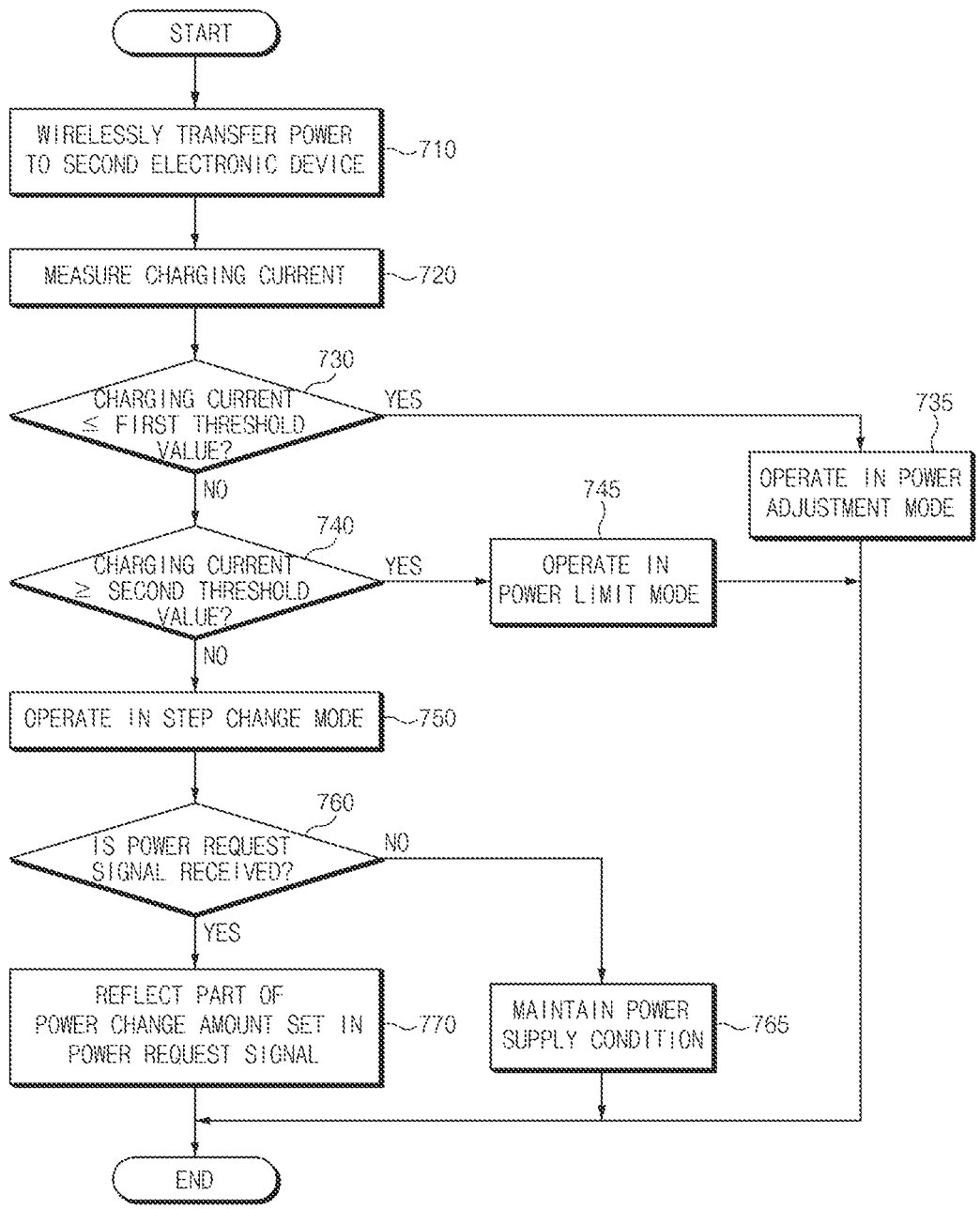
FIG. 7A is a flowchart illustrating an example device-to-device wireless power transfer method according to various embodiments.

FIG. 7A is a flowchart illustrating an example device-to-device wireless power transfer method in various embodiments. Hereinafter, the operation of the first wireless charging circuit 520 may be an operation by an operation element (e.g., an MCU) or a processor 505 in the first wireless charging circuit 520.

Referring to FIG. 7A, in operation 710, the first power management circuit 510 of the first electronic device 501 (e.g., the first electronic device 101 of FIG. 1) may transfer power received from the battery 506 (or the external power source 503) to the second electronic device 502 wirelessly through the first wireless charging circuit 520 and the first conductive coil 530.

According to an example, the first electronic device 501 and the second electronic device 502 may enter the power transfer step 630 through the device detection step 610 and the device identification step 620 of FIG. 6 and transfer and receive power wirelessly.

In operation 720, the first wireless charging circuit 520 may measure a charging current Iout flowing from the first power management circuit 510 to the first wireless charging circuit 520 through the wireless power terminal 511. In an example, the first wireless charging circuit 520 may measure the charging current Iout in real time or at a predetermined time interval to use the charging current Iout for wireless power control.

In operation 730, the first wireless charging circuit 520 may determine whether the charging current Iout is less than or equal to a specified first threshold value. In an example, the first threshold value may be a value lower than the maximum allowable current value Iout_Max set in the first power management circuit 510. For example, the first threshold value may be a maximum allowable current value (Iout_Max)*90%.

In operation 735, when the charging current Iout is less than or equal to (or less than) the first threshold value ("Yes" in operation 730), the first wireless charging circuit 520 may operate in a mode (hereinafter, referred to as a power adjustment mode) for changing a power supply condition (or power supply state) (e.g., a charging voltage, a maximum allowable current value (operating point) (e.g., charging voltage, the maximum allowable current value or frequency value) in response to a signal (fifth signal in FIG. 6) (e.g., a "control error packet (CEP)") requesting an increase (or decrease) in the power received from the second electronic device 502.

In the power adjustment mode, the first wireless charging circuit 520 may adjust wireless Tx power corresponding to the fifth signal (e.g., a "control error packet (CEP)") (hereinafter, referred to as a power request signal) requesting an increase or decrease in power to be transferred, According to an example, when a power change amount with respect to the power request signal is set in advance, the first wireless charging circuit 520 may transmit the power request signal to the second electronic device 502 every time when the power request signal is received.

In operation 740, when the charging current Iout exceeds a specified first threshold value ("No" in operation 730), the first wireless charging circuit 520 may determine whether at which the charging current Iout exceeds (or is greater than or equal to) the specified second threshold value greater than the first threshold value. In an example, the second threshold value may be a value equal to the maximum allowable current value Iout_Max set in the first power management circuit 510.

In operation 745, when the charging current Iout exceeds (or is greater than or equal to) the specified second threshold value, the first wireless charging circuit 520 may operate in a mode for maintaining the charging current Iout (hereinafter, the power limit mode).

In the power limit mode, the first wireless charging circuit 520 may ignore the power request signal of the second electronic device 502. According to an example, a request for increasing power due to the CEP packet of the second electronic device 502 may be ignored. The first wireless charging circuit 520 may maintain the charging current Iout for wireless charging, thus enabling wireless charging operation not to be terminated.

According to an example, when the charging voltage Vout or the maximum allowable current value Iout_Max of the first power management circuit 510 is changed, the first wireless charging circuit 520 may provide relevant information to the second electronic device 502.

In operation 750, when the charging current Iout is between the first threshold value and the second threshold value, the first wireless charging circuit 520 may operate in a mode for changing a wireless charging state in a stepwise manner (hereinafter, referred to as a step change mode).

In the step change mode, the first wireless charging circuit 520 may increase only a part of power set in the power request signal in response to the power request signal of the second electronic device 501.

According to various embodiments, the first wireless charging circuit 520 may also change the wireless charge state based on a voltage measured at the wireless power terminal 511 to which the first power management circuit 510 and the first wireless charging circuit 520 are connected.

In operation 760, the first wireless charging circuit 520 may determine whether the power request signal is received from the second electronic device 502. The power request signal may be a signal (e.g., the "control error packet (CEP)") requesting an increase (or decrease) in power being transferred.

In operation 765, when the power request signal is not received from the second electronic device 502, the first wireless charging circuit 520 may maintain a power supply condition.

In operation 770, when the power request signal is received from the second electronic device 502, the first wireless charging circuit 520 may change the power supply condition so as to reflect a part of the power change amount which is set in advance with respect to the power request signal, For example, the first wireless charging circuit 520 may change the power supply condition so as to reflect only 10% of the power change amount which is set in advance with respect to the power request signal.

According to various embodiments, while wireless charging is continuously performed, the first wireless charging circuit 520 may measure the charging current Iout according to a specified time period, and change the power supply condition according to operations 720 to 770.

Figure 7B:
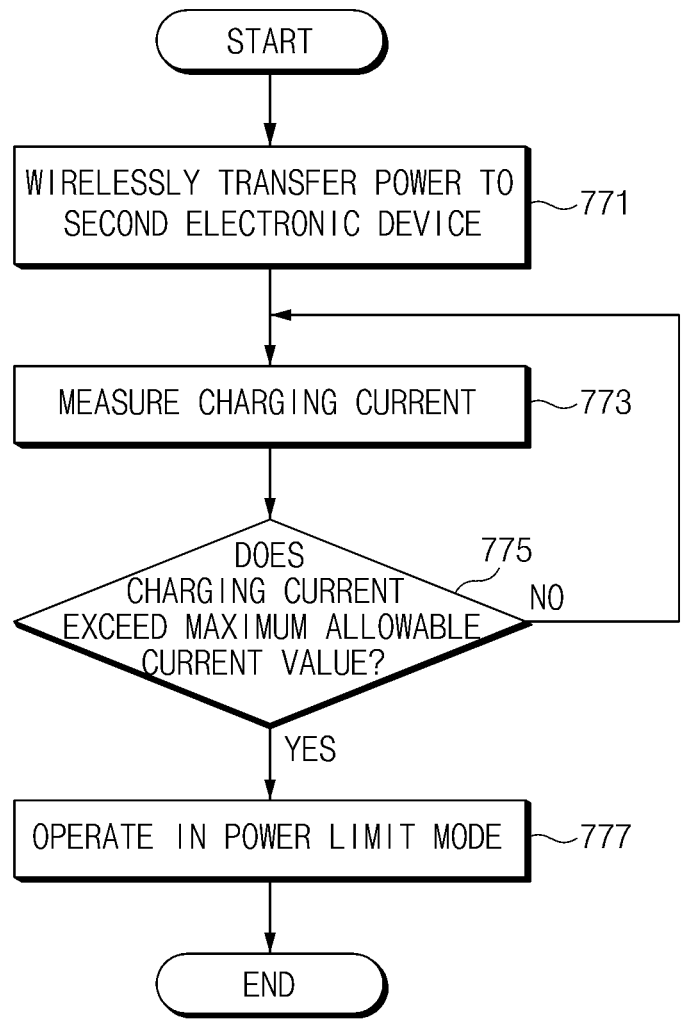
FIG. 7B is a flowchart illustrating an example operation in a power limit mode according to various embodiments.

FIG. 7B is a flowchart illustrating an example operation in a power limit mode according to various embodiments.

Referring to FIG. 7B, in operation 771, the first power management circuit 510 of the first electronic device 501 (e.g., the first electronic device 101 of FIG. 1) may transfer power received from the battery 506 (or the external power source 503) to the second electronic device 502 wirelessly through the first wireless charging circuit 520 and the first conductive coil 530.

In operation 773, the first wireless charging circuit 520 may measure a charging current Iout flowing from the first power management circuit 510 to the first wireless charging circuit 520 through the wireless power terminal 511.

In operation 775, the first wireless charging circuit 520 may determine whether the measured charging current Iout exceeds the maximum allowable current value Iout_Max set in the first power management circuit 510.

In operation 777, when the measured charging current Iout exceeds the maximum allowable current value Iout_Max, the first wireless charging circuit 520 may operate in the power limit mode in which the first wireless charging circuit 520 is to maintain the charging current Iout.

In the power limit mode, the first wireless charging circuit 520 may ignore the power request signal of the second electronic device 502. According to an example, a request for increasing power due to the CEP packet of the second electronic device 502 may be ignored. The first wireless charging circuit 520 may maintain the charging current Iout for wireless charging, thus enabling wireless charging operation not to be terminated.

According to various embodiments, when the first electronic device 501 ignores the power request signal (CEP packet) of the second electronic device 502, the second electronic device 502 may transmit the power request signal continuously within a period allowed by a wireless charging-related standard. In this case, the first electronic device 501 may transmit a command (or an additional packet) to extend the period for transmitting the power request signal to the second electronic device 502. When the second electronic device 502 does not receive a response of the first electronic device 501 in response to the power request signal more than a specified number of times, the second electronic device 502 may extend the period for transmitting the power request signal. The second electronic device 502 may linearly increase the period for transmitting the CEP packet (e.g., 10 ms, 20 ms, 30 ms, and 40 ms) or exponentially increase the period for transmitting the CEP packet (e.g., 10 ms, 20 ms, 40 ms, and 80 ms).

Figure 7C:
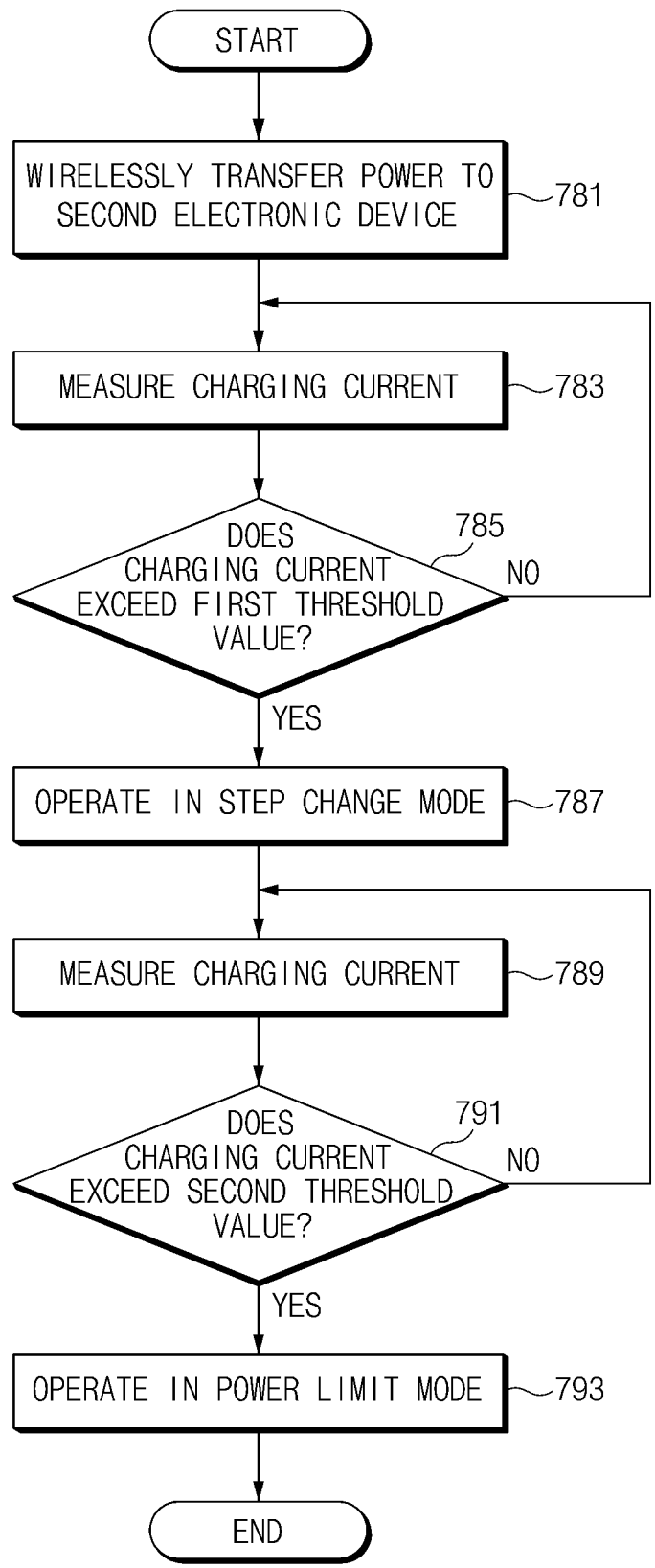
FIG. 7C is a flowchart illustrating an example operation in a step change mode and a power limit mode according to various embodiments.

FIG. 7C is a flowchart illustrating an example operation in a step change mode and a power limit mode according to various embodiments.

Referring to FIG. 7C, in operation 781, the first power management circuit 510 of the first electronic device 501 (e.g., the first electronic device 101 of FIG. 1) may transfer power received from the battery 506 (or the external power source 503) to the second electronic device 502 wirelessly through the first wireless charging circuit 520 and the first conductive coil 530.

In operation 783, the first wireless charging circuit 520 may measure a charging current Iout flowing from the first power management circuit 510 to the first wireless charging circuit 520 through the wireless power terminal 511.

In operation 785, the first wireless charging circuit 520 may determine whether the measured charging current Iout exceeds a first threshold value. The first threshold value may be a value lower than the maximum allowable current value Iout_Max set in the first power management circuit 510. For example, the first threshold value may be a maximum allowable current value Iout_Max*90%.

In operation 787, when the charging current Iout exceeds the specified first threshold value, the first wireless charging circuit 520 may operate in the step change mode for changing the wireless charging state in a stepwise manner. In the step change mode, the first wireless charging circuit 520 may increase a part of the power set in the power request signal in response to the power request signal of the second electronic device 501.

In operation 789, while operating in the step change mode, the first wireless charging circuit 520 may measure the charging current Iout.

In operation 791, the first wireless charging circuit 520 may determine whether the charging current Iout exceeds a specified second threshold value that is greater than the first threshold value. The second threshold value may be a value equal to the maximum allowable current value Iout_Max set in the first power management circuit 510.

In operation 793, when the charging current Iout exceeds the specified second threshold value, the first wireless charging circuit 520 may operate in the power limit mode for maintaining the charging current Iout.

In the power limit mode, the first wireless charging circuit 520 may ignore the power request signal of the second electronic device 502. According to an example, a request for increasing power due to the CEP packet of the second electronic device 502 may be ignored. The first wireless charging circuit 520 may maintain the charging current Iout for wireless charging, thus enabling wireless charging operation not to be terminated.

Figure 8:
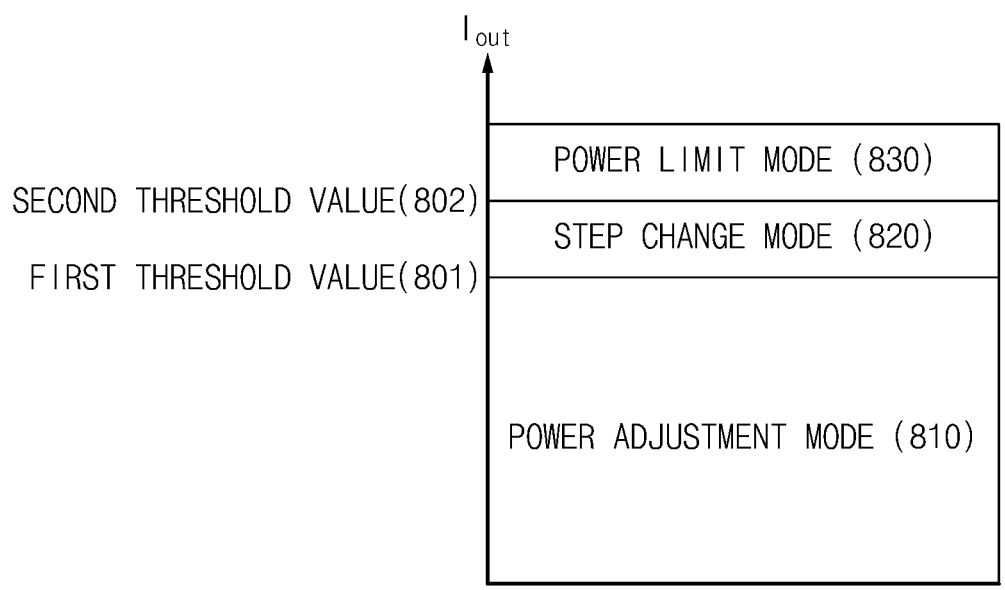
FIG. 8 is a diagram illustrating example mode change according to measured charging currents according to various embodiments.

FIG. 8 is a diagram illustrating example mode change according to measured charging currents according to various embodiments.

Referring to FIG. 5 and FIG. 8, the first wireless charging circuit 520 may measure a charging current Iout flowing from the first power management circuit 510 to the first wireless charging circuit 520 through the wireless power terminal 511.

The first wireless charging circuit 520 may change a mode related to wireless power transfer based on the measured charging current Iout.

For example, when the charging current Iout is less than or equal to a first threshold value 810, the first wireless charging circuit 520 may operate in a power adjustment mode 810. In the power adjustment mode 810, the first wireless charging circuit 520 may increase or decrease the amount of power transferred wirelessly in response to a power request signal requesting an increase or decrease in power to be transferred.

For another example, when the charging current Iout is between the first threshold value 801 and the second threshold value 802, the first wireless charging circuit 520 may operate in the step change mode 820. In the step change mode, the first wireless charging circuit 520 may adjust the amount of power transferred wirelessly by reflecting a part of a power change amount set in the power request signal in response to the power request signal of the second electronic device 501.

For another example, when the charging current Iout exceeds the second threshold value 802, the first wireless charging circuit 520 may operate in the power limit mode 830. In the power limit mode 830, the first wireless charging circuit 520 may ignore the power request signal of the second electronic device 502 and maintain a current power supply condition.

Figure 9:
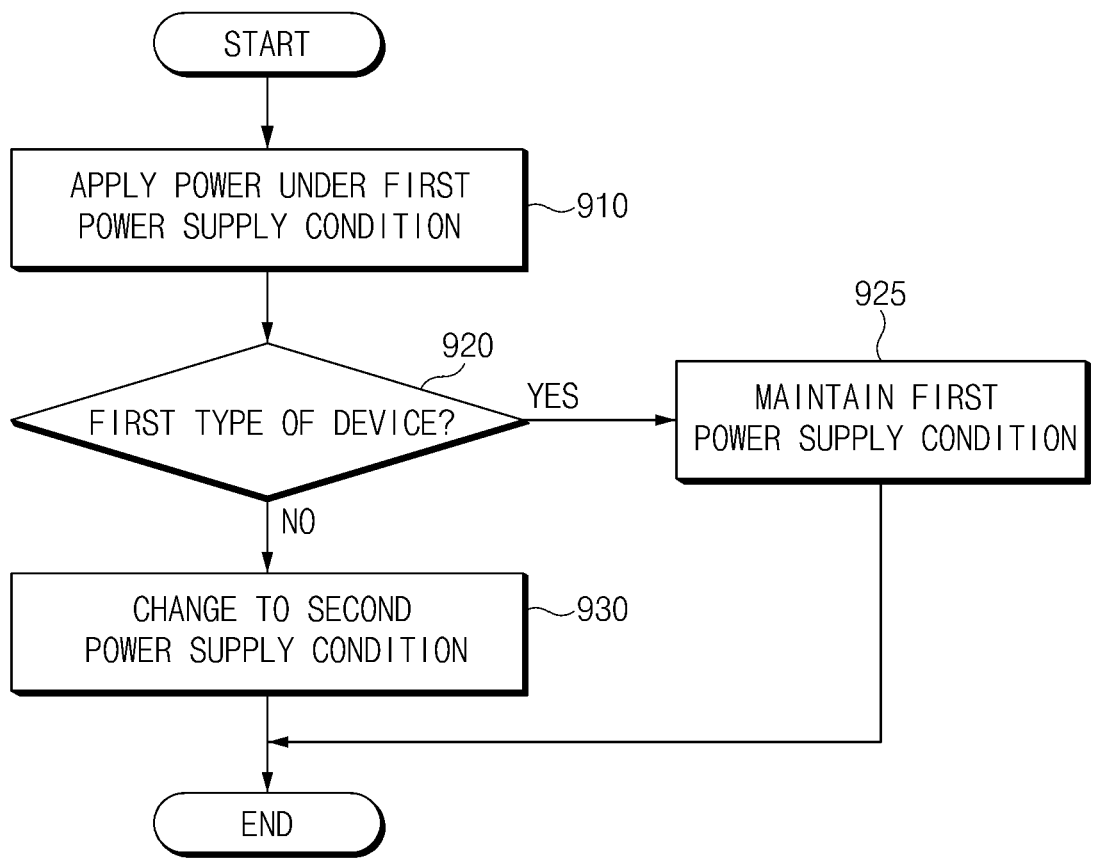
FIG. 9 is a flowchart illustrating an example wireless charging method according to a type of a second electronic device according to various embodiments.

FIG. 9 is a flowchart illustrating an example wireless charging method according to a type of a second electronic device according to various embodiments.

Referring to FIG. 9, in operation 910, when the power transfer step 630 of FIG. 6 is started, the first wireless charging circuit 520 of the first electronic device 501 may transfer power to the second electronic device 502 under a first power supply condition according to basic settings. The first power supply condition may have a first charging voltage Vout1 applied to the wireless power terminal 511 and a first maximum allowable current value Iout_Max1 of the charging current Iout that may flow through the wireless power terminal 511. For example, the first charging voltage Vout1 may be 5V, and the first maximum allowable current value Iout_Max1 may be 1.5 A.

In operation 920, the first wireless charging circuit 520 may determine whether the second electronic device 502 is a first type of device that is charged by the specified first charging voltage Vout1. For example, the first type of device may be a wearable device such as a smart watch, a smart band, or smart glasses.

In operation 925, when the second electronic device 502 is the first type of device, the first wireless charging circuit 520 may maintain a state in which wireless power is transferred based on the first power supply condition. In the case of a wearable device, the wearable device may be charged at a relatively low voltage.

In operation 930, when the second electronic device 502 is a second type of device other than the first type of device, the first wireless charging circuit 520 may change from the first power supply condition to a second power supply condition and transfer wireless power. For example, the second type of device may be a smartphone, a tablet PC, or a sound output device.

The second power supply condition may have a second charging voltage Vout2 applied to the wireless power terminal 511 and a second maximum allowable current value Iout_Max2 of the charging current Iout that may flow through the wireless power terminal 511. The second charging voltage Vout2 of the second power supply condition may be higher than the first charging voltage Vout1 of the first power supply condition. The second maximum allowable current value Iout_Max2 of the second power supply condition may be lower than the first maximum allowable current value Iout_Max1 of the first power supply condition.

For example, when the first charging voltage Vout1 may be 5 V and the first maximum allowable current value Iout_Max1 is 1.5 A, the second charging voltage Vout2 may be 7.5 V and the second maximum allowable current value Iout_Max2 may be 1.1 A. As a result, the amount of power provided by the first power management circuit 510 may be maintained below a specified value (e.g., about 8.25 W) under the first power supply condition and the second power supply condition.

According to various embodiments, when the external power source 503 is connected, the first wireless charging circuit 520 may transfer wireless power by changing a power supply condition. The first wireless charging circuit 520 may change the power supply condition according to the type of the second electronic device 102 or the type of the external power source 503 (see FIG. 11).

Figure 10:
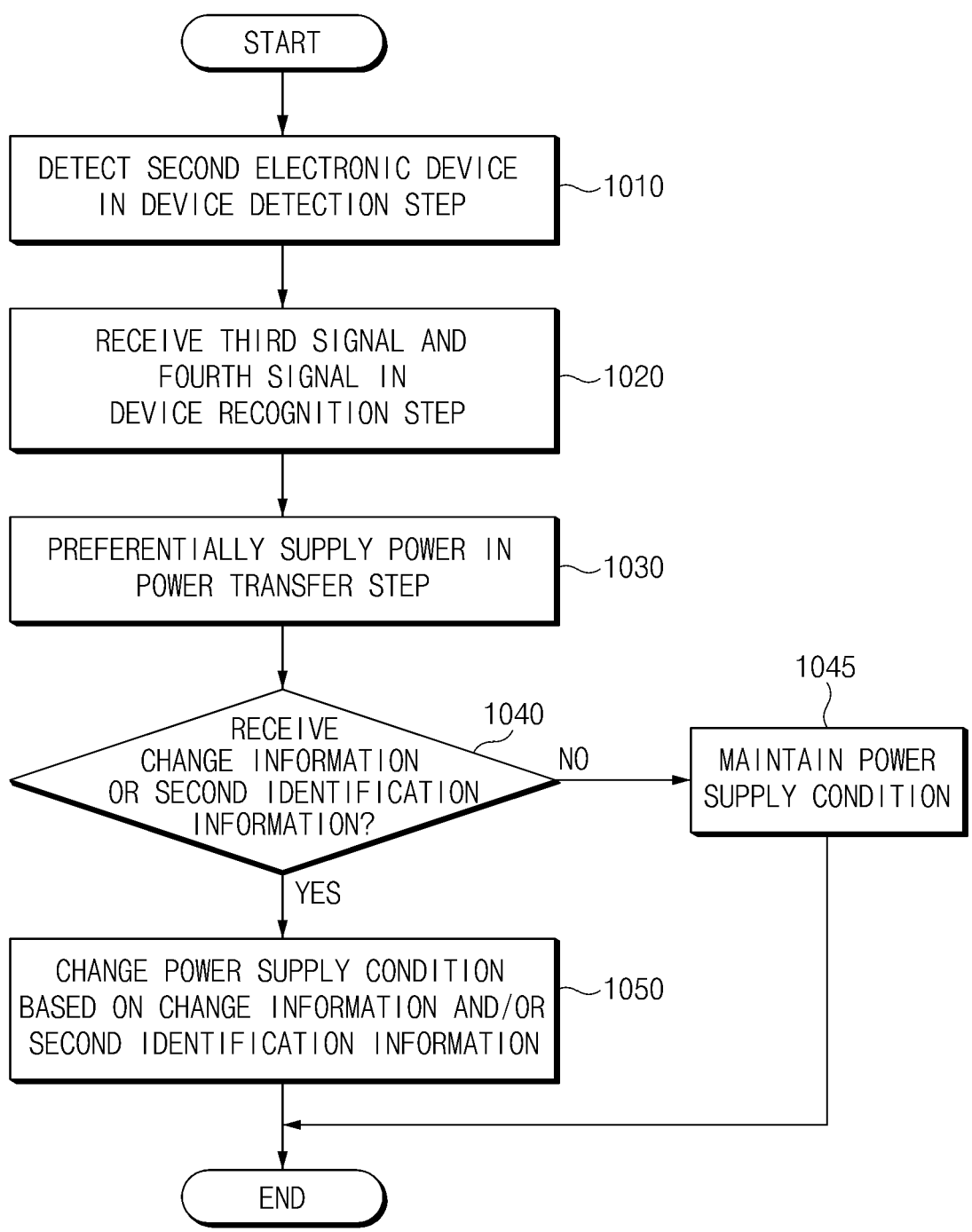
FIG. 10 is a flowchart illustrating an example method of recognizing a type of a second electronic device in a device-to-device wireless charging process according to various embodiments.

FIG. 10 is a flowchart illustrating an example method of recognizing a type of a second electronic device in a device-to-device wireless charging process according to various embodiments.

Referring to FIG. 10, in operation 1010, in the device detection step 610 of FIG. 6, the first wireless charging circuit 520 of the first electronic device 501 may transmit a first signal (e.g., a digital ping) and detect the second electronic device 502 which is to receive the wireless power. When the first wireless charging circuit 520 receives a second signal (e.g., a signal strength packet (SSP)) corresponding to the first signal from the second electronic device 502, the first wireless charging circuit 520 may start a wireless power transfer process.

In operation 1020, in the device identification step 610 of FIG. 6, the first wireless charging circuit 520 may receive a third signal that is a signal related to the identification of the second electronic device 502 (e.g., a WPC version, Power Receiver Manufacturer Codes (PRMC), or product codes) and a fourth signal that is a signal related to the power settings of the second electronic device 502 (e.g., power class, maximum power), from the second electronic device 502.

According to an example, the first wireless charging circuit 520 may receive power receiver manufacturer codes (PRMC) (or a unique number of a wireless charging IC) as the third signal (hereinafter, referred to as first identification information). The first wireless charging circuit 520 may determine a power supply condition (operating point) (e.g., a charging voltage, a maximum allowable current value, or a frequency value) by identifying the first identification information (e.g., PRMC). According to an example, the power supply condition (operating point) may be a condition for setting a voltage input to the first wireless charging circuit 520, not a peak to peak voltage of AC power over the first coil 530.

The first wireless charging circuit 520 may identify a type of the second electronic device 502 by using the first identification information (e.g., PRMC) and enter a state in which power is capable of being stably transferred before power transfer is substantially performed.

For example, the first wireless charging circuit 520 may be set to a power supply condition corresponding to the power receiver manufacturer codes (PRMC) of the second power management circuit 560 of the recognized second electronic device 502.

In operation 1030, in the power transfer step 630 of FIG. 6, the first wireless charging circuit 520 may preferentially supply wireless power to the second electronic device 502 under a specified power supply condition.

In operation 1040, in the power transfer step 630, the first wireless charging circuit 520 may determine whether information (hereinafter, referred to as change information) for changing a specified power supply condition or separate identification information unique to the second electronic device 502 (hereinafter referred to as second identification information) is received.

According to an example, the change information may be a packet indicating end of charging in a general wireless charging device (e.g., a charging pad) that is not a device-to-device wireless power transfer function.

According to an example, the second identification information may be an ID (e.g., a device unique number) unique to each second electronic device 502.

In operation 1045, when the change information or the second identification information is not received, the first wireless charging circuit 520 may maintain an existing power supply condition.

In operation 1050, when receiving the change information or the second identification information, the first wireless charging circuit 520 may change the power supply condition based on the change information and/or the second identification information.

There may be a plurality of devices having different characteristics in terms of mechanical characteristics (e.g., battery, or coil) even when they have the same first identification information (e.g., PRMC). The first wireless charging circuit 520 may set a power supply condition customized for the second electronic device 502 based on the change information or the second identification information. As a result, it is possible to reduce deterioration during the wireless power transfer process and improve power transfer efficiency.

According to various embodiments, after the power supply condition is changed, the first power management circuit 510 may change the power supply condition or return to a previous state according to a separate power request signal from the second electronic device 502.

According to various embodiments, when the first wireless charging circuit 520 receives a charge termination request signal from the second electronic device 502, the first wireless charging circuit 520 may terminate the wireless charging process.

Figure 11:
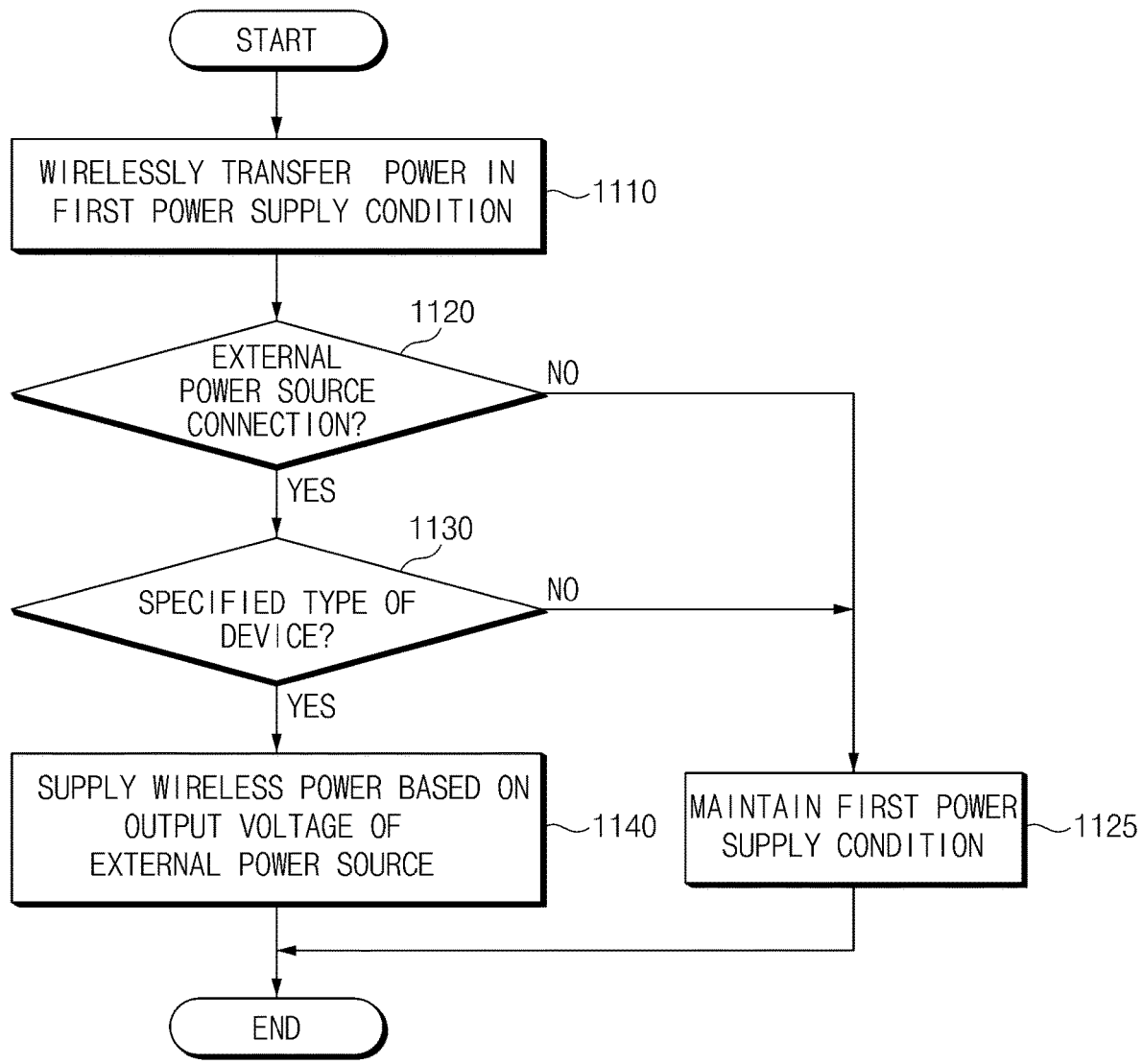
FIG. 11 is a flowchart illustrating an example change of a power supply condition according to connection of an external power source according to various embodiments.

FIG. 11 is a flowchart illustrating an example change of a power supply condition according to connection of an external power source according to various embodiments.

Referring to FIG. 11, in operation 1110, when the external power source 503 is not connected, the first wireless charging circuit 520 may wirelessly transfer power to the second electronic device 502 under a first power supply condition.

The first power supply condition may have a first charging voltage Vout1 applied to the wireless power terminal 511 and a first maximum allowable current value Iout_Max1 of the charging current Iout that may flow through the wireless power terminal 511. For example, the first charging voltage Vout1 may be 5V, and the first maximum allowable current value Iout_Max1 may be 1.5 A.

In operation 1120, the first power management circuit 510 may identify the connection of the external power source 503. For example, the external power source 503 may be a travel adapter (TA).

In operation 1125, when the external power source 503 is not connected, the first wireless charging circuit 520 may maintain the first power supply condition according to basic settings.

In operation 1330, when the external power source 503 is connected, the first wireless charging circuit 520 may determine whether the second electronic device 502 is a specified type of device in which the power supply condition is capable of being changed. For example, the specified type of device may be a smartphone or a tablet PC.

When the second electronic device 502 is not the specified type of device, the first wireless charging circuit 520 may maintain the first power supply condition according to the basic settings.

In operation 1140, when the second electronic device 502 is the specified type of device, the first wireless charging circuit 520 may transfer or supply wireless power based on an output voltage of the external power source 503.

According to an example, the first wireless charging circuit 520 may determine whether the output voltage of the external power source 503 is less than or equal to a first charging voltage Vout1 of the first power supply condition. When the output voltage of the external power source 503 is equal to or lower than the first charging voltage Vout1 according to specified basic settings, the first wireless charging circuit 520 may operate under the second power supply condition based on the output voltage of the external power source 503. The second charging voltage Vout2 of the second power supply condition may have a value (7.5V) higher than the output voltage (5V) of the external power source 503. In this case, the second maximum allowable current value Iout_Max2 of the second power supply condition may be lower than the first maximum allowable current value Iout_Max1 of the first power supply condition.

According to various embodiments, the first wireless charging circuit 520 may operate under the second power supply condition and the separate power supply condition according to a specified time period during operation as the second power supply condition. The separate power supply condition may have a charging voltage and a maximum allowable current value which are lower than those of the second power supply condition (e.g., 5V and 0.3 A).

According to various embodiments, when the external power source 503 is disconnected, the first power management circuit 510 may operate under the first power supply condition.

According to an example, when the output voltage of the external power source 503 exceeds the first charging voltage Vout1 according to the specified basic settings, the first wireless charging circuit 520 may operate under the second power supply condition and, after a specified period of time, operate under a third power supply condition.

The second charging voltage Vout2 of the second power supply condition may have a value (7.5V) lower than the output voltage (9V) of the external power source 503 and higher than the first charging voltage (5V). In this case, the second maximum allowable current value Iout_Max2 (e.g., 1.1 A) of the second power supply condition may be lower than the second maximum allowable current value Iout_Max2 (e.g., 1.5 A) of the first power supply condition.

A third charging voltage Vout3 of a third power supply condition may have the same value as the output voltage (9V) of the external power source 503. In this case, the third maximum allowable current value Iout_Max3 (e.g., 1.0 A) of the third power supply condition may be lower than the second maximum allowable current value Iout_Max2 (e.g., 1.1 A) of the second power supply condition.

Figure 12:
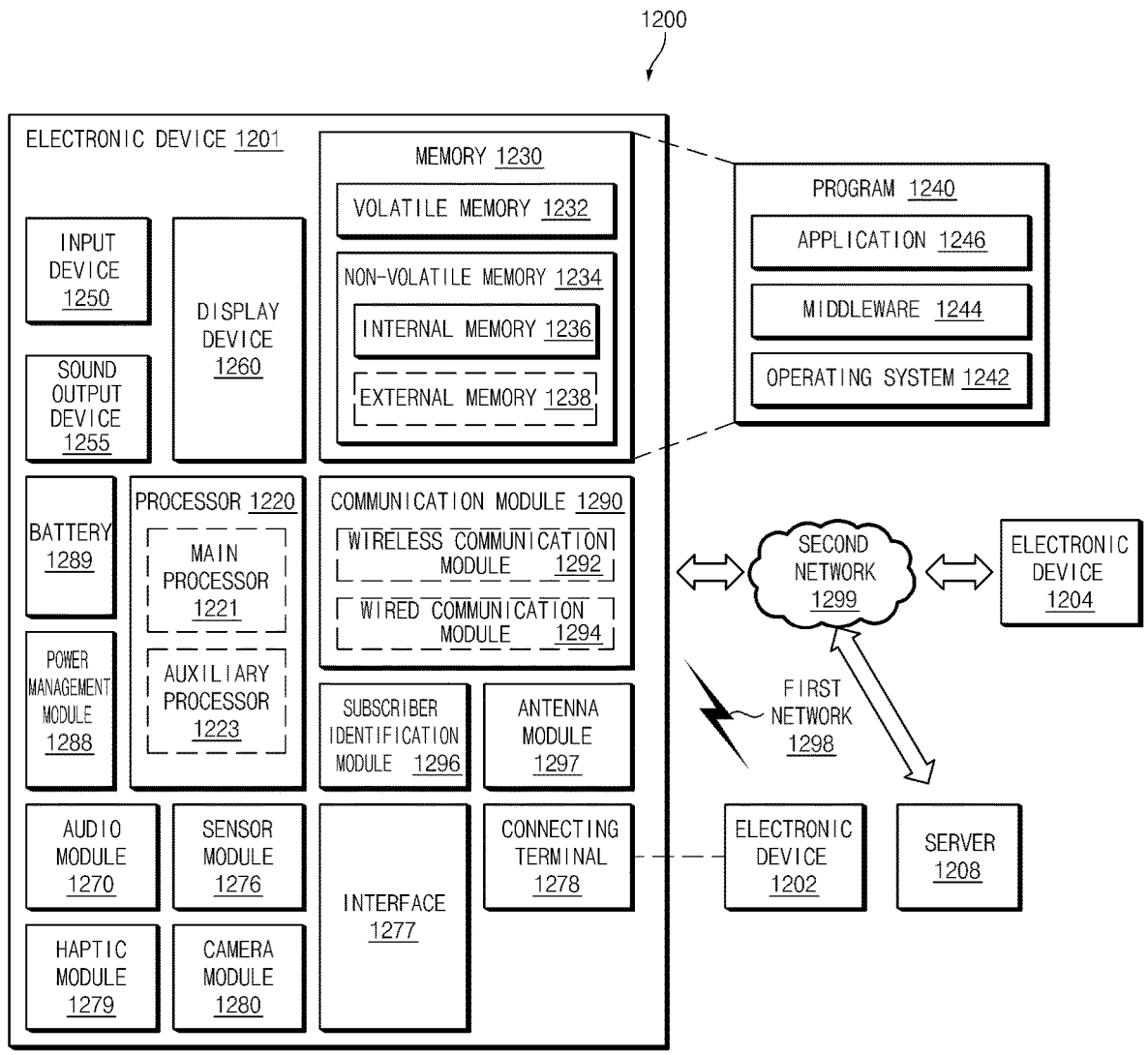
FIG. 12 is a block diagram illustrating an example electronic device in a network environment, according to various embodiments.

FIG. 12 is a block diagram of an example electronic device 1201 in a network environment 1200, according to various embodiments.

Referring to FIG. 12, the electronic device 1201 in the network environment 1200 may communicate with an electronic device 1202 over a first network 1298 (e.g., a short range wireless communication network) or may communicate with an electronic device 1204 or a server 1208 over a second network 1299 (e.g., a long distance wireless communication network). According to an embodiment, the electronic device 1201 may communicate with the electronic device 1204 through the server 1208. According to an embodiment, the electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, or an antenna module 1297. In any embodiment, at least one (e.g., the display device 1260 or the camera module 1280) of the components may be omitted from the electronic device 1201, or one or more other components may be further included in the electronic device 1201. In any embodiment, some of the components may be implemented with a single integrated circuit. For example, the sensor module 1276 (e.g., a fingerprint sensor, an iris sensor, or an illumination sensor) may be embedded in the display device 1260 (e.g., a display).

The processor 1220 may execute, for example, software (e.g., a program 1240) to control at least one other component (e.g., a hardware or software component) of the electronic device 1201 connected to the processor 1220, and may perform various data processing or operations. According to an embodiment, as at least a part of the data processing or operations, the processor 1220 may load a command or data received from any other component (e.g., the sensor module 1276 or the communication module 1290) to a volatile memory 1232, may process the command or data stored in the volatile memory 1232, and may store processed data in a nonvolatile memory 1234. According to an embodiment, the processor 1220 may include a main processor 1221 (e.g., a central processing unit or an application processor) and a auxiliary processor 1223 (e.g., a graphic processing device, an image signal processor, a sensor hub processor, or a communication processor), which may be operated independently of or together with the main processor 1221. Additionally or alternatively, the auxiliary processor 1223 may be configured to use lower power than the main processor 1221 or to be specialized for a specified function. The auxiliary processor 1223 may be implemented separately from the main processor 1221 or may be implemented as a part of the main processor 1221.

The auxiliary processor 1223 may control at least a part of a function or states associated with at least one component (e.g., the display device 1260, the sensor module 1276, or the communication module 1290) of the electronic device 1201, for example, instead of the main processor 1221 while the main processor 1221 is in an inactive (e.g., sleep) state and together with the main processor 1221 while the main processor 1221 is in an active (e.g., an application execution) state. According to an embodiment, the auxiliary processor 1223 (e.g., an image signal processor or a communication processor) may be implemented as a part of any other component (e.g., the camera module 1280 or the communication module 1290) which is functionally (or operatively) associated with the auxiliary processor 1223.

The memory 1230 may store various data which are used by at least one component (e.g., the processor 1220 or the sensor module 1276) of the electronic device 1201. The data may include, for example, software (e.g., the program 1240), or input data or output data associated with a command of the software. The memory 1230 may include the volatile memory 1232 or the nonvolatile memory 1234.

The program 1240 may be stored in the memory 1230 as software, and may include, for example, an operating system 1242, a middleware 1244, or an application 1246.

The input device 1250 may receive a commands or data which will be used by a component (e.g., the processor 1220) of the electronic device 1201, from the outside (e.g., a user) of the electronic device 1201. The input device 1250 may include, for example, a microphone, a mouse, or a keyboard.

The sound output device 1255 may output a sound signal to the outside of the electronic device 1201. The sound output device 1255 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1260 may visually provide information to the outside (e.g., the user) of the electronic device 1201. The display device 1260 may include, for example, a display, a hologram device, or a control circuit for controlling a projector and a corresponding device. According to an embodiment, the display device 1260 may include a touch circuitry configured to sense a touch, or a sensor circuitry (e.g., a pressure sensor) configured to measure the strength of force generated by the touch.

The audio module 1270 may convert sound to an electrical signal, or reversely, may convert an electrical signal to sound. According to an embodiment, the audio module 1270 may obtain sound through the input device 1250, or may output sound through the sound output device 1255, or through an external electronic device (e.g., the electronic device 1202) (e.g., a speaker or a headphone) directly or wirelessly connected with the electronic device 1201.

The sensor module 1276 may sense an operation state (e.g., power or a temperature) of the electronic device 1201 or an external environment state (e.g., a user state), and may generate an electrical signal or a data value corresponding the sensed state. According to an embodiment, the sensor module 1276 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1277 may support one or more specified protocols that may be used to directly and wirelessly connect the electronic device 1201 with an external electronic device (e.g., the electronic device 1202). According to an embodiment, the interface 1277 may include, for example, a high definition multimedia interface (HDMI), a universal serial bus (USB) interface, a secure digital (SD) card interface, or an audio interface.

A connection terminal 1278 may include a connector that may allow the electronic device 1201 to be physically connected with an external electronic device (e.g., the electronic device 1202). According to an embodiment, the connection terminal 1278 may include, for example, a HDMI connector, a USB connector, a SD card connector, or an audio connector (e.g., a headphone connector).

The haptic module 1279 may convert an electrical signal to a mechanical stimulation (e.g., vibration or movement) or an electrical stimulation which the user may perceive through the sense of touch or the sense of movement. According to an embodiment, the haptic module 1279 may include, for example, a motor, a piezoelectric sensor, or an electrical stimulation device.

The camera module 1280 may photograph a still image and a video. According to an embodiment, the camera module 1280 may include one or more lenses, image sensors, image signal processors, or flashes (or electrical flashes).

The power management module 1288 may manage the power which is supplied to the electronic device 1201. According to an embodiment, the power management module 1288 may be implemented, for example, as at least a part of a power management integrated circuit (PMIC).

The battery 1289 may power at least one component of the electronic device 1201. According to an embodiment, the battery 1289 may include, for example, a primary cell not recharged, a secondary cell rechargeable, or a fuel cell.

The communication module 1290 may establish a direct (or wired) communication channel or a wireless communication channel between the electronic device 1201 and an external electronic device (e.g., the electronic device 1202, the electronic device 1204, or the server 1208) or may perform communication through the established communication channel. The communication module 1290 may include one or more communication processors which is operated independently of the processor 1220 (e.g., an application processor) and supports direct (or wired) communication or wireless communication. According to an embodiment, the communication module 1290 may include a wireless communication module 1292 (e.g., a cellular communication module, a short range wireless communication module, or a global navigation satellite system (GNSS) communication module) or a wired communication module 1294 (e.g., a local area network (LAN) communication module or a power line communication module). A corresponding communication module of such communication modules may communicate with an external electronic device over the first network 1298 (e.g., a short range communication network such as Bluetooth, Wi-Fi direct, or infrared data association (IrDA)) or the second network 1299 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1292 may verify and authenticate the electronic device 1201 within a communication network, such as the first network 1298 or the second network 1299, by using subscriber information (e.g., international mobile subscriber identity (IMSI)) stored in the subscriber identification module 1296.

The antenna module 1297 may transmit a signal or a power to the outside (e.g., an external electronic device) or may receive a signal or a power from the outside. According to an embodiment, the antenna module 1297 may include one or more antennas, and at least one antenna which is suitable for a communication scheme used in a computer network such as the first network 1298 or the second network 1299 may be selected, for example, by the communication module 1290 from the one or more antennas. The signal or power may be exchanged between the communication module 1290 and an external electronic device through the selected at least one antenna or may be received from the external electronic device through the selected at least one antenna and the communication module 1290.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1201 and the external electronic device 1204 through the server 1208 connecting to the second network 1299. Each of the electronic devices 1202 and 1204 may be a device, the kind of which is the same as or different from a kind of the electronic device 1201. According to an embodiment, all or a part of operations to be executed in the electronic device 1201 may be executed in one or more external devices of the external electronic devices 1202, 1204, or 1208. For example, in the case where the electronic device 1201 should perform any function or service automatically or in response to a request from the user or any other device, the electronic device 1201 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1201. The electronic device 1201 may process received result as it is or additionally, and may provide a result of the processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be understood to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1240) including an instruction stored in a machine-readable storage medium (e.g., an internal memory 1236 or an external memory 1238) readable by a machine (e.g., the electronic device 1201). For example, the processor (e.g., the processor 1220) of a machine (e.g., the electronic device 1201) may call the instruction from the machine-readable storage medium and execute the instructions thus called. The machine may perform at least one function based on the called at least one instruction. The one or more instructions may include a code generated by a compiler or a code executable by an interpreter. The machine-readable storage medium may be provided in the form of non-transitory storage medium. The "non-transitory" storage medium is tangible, but may not include a signal (e.g., an electromagnetic wave). The term "non-transitory" does not differentiate a case where the data is permanently stored in the storage medium from a case where the data is temporally stored in the storage medium.

An electronic device according to various example embodiments may include a housing having a first surface, a second surface opposite the first surface, and a side surface between the first surface and the second surface, a display having at least a portion viewable through the first surface, a conductive coil disposed between the display and the second surface in the housing, a wireless charging circuit electrically connected to the conductive coil, a power management circuit connected to the wireless charging circuit, a battery connected to the power management circuit, and a processor operatively connected to the display and the power management circuit, and the processor may be configured to control the electronic device to: measure a current flowing from the power management circuit to the wireless charging circuit while power is transferred to an external device through the conductive coil, and adjust the power transferred to the external device through the conductive coil based on a part of a power amount preset in a signal requesting addition of power based on a value of the current being between a first threshold value and a second threshold value greater than the first threshold value.

According to various example embodiments, the first threshold value and the second threshold value may be determined based on a maximum allowable value of the current, which is set in the power management circuit.

According to various example embodiments, the first threshold value may be a first rate of the maximum allowable value, and the second threshold value may be equal to the maximum allowable value.

According to various example embodiments, the processor may be configured to control the electronic device to: receive first identification information from the external device through the conductive coil before the power is transferred to the external device, and set the maximum allowable value based on the first identification information.

According to various example embodiments, the processor may be configured to control the electronic device to: receive second identification information from the external device through the conductive coil after the power starts to be transferred to the external device, and set the maximum allowable value based on the second identification information. The second identification information may include unique device information of the external device. The second identification information may include unique device information of the external device.

According to various example embodiments, the processor may be configured to control the electronic device to: detect connection of an external power source to the power management circuit, and change the maximum allowable value when the external power source is connected.

According to various example embodiments, the processor may be configured to control the electronic device to: maintain the maximum allowable value based on the external device being a first specified type of device. Based on the external device being a second specified type of device, the processor may be configured to control the electronic device to increase a voltage applied to the wireless charging circuit from the power management circuit in a stepwise manner, and decrease the maximum allowable value in a stepwise manner based on an increase in the voltage.

According to various example embodiments, the processor may be configured to control the electronic device to determine change amounts in the voltage and the maximum allowable value based on an output voltage of the external power source.

According to various example embodiments, the processor may be configured to control the electronic device to: adjust the power transferred to the external device through the conductive coil based on a whole of the power amount based on the signal being received in a state in which the value of the current is less than the first threshold value.

According to various example embodiments, the processor may be configured to control the electronic device to: maintain power transferred to the external device regardless of the signal requesting addition of power based on the signal being received in a state in which the value of the current exceeds the second threshold value.

According to various example embodiments, the processor may be configured to control the electronic device to: transmit a response signal requesting the external device to stop transmission of the signal or increase a transmission period based on the value of the current being between the first threshold value and the second threshold value.

According to various example embodiments, the processor may include a micro controller unit (MCU) in the wireless charging circuit.

A method of transferring wireless power, according to various example embodiments may include transferring a first signal using a conductive coil in the electronic device, receiving a second signal corresponding to the first signal from an external device, receiving a third signal including first identification information for the external device and a fourth signal for settings of wireless power transfer from the external device, wirelessly transferring power to the external device based on the third signal and the fourth signal, measuring a current flowing from a power management circuit of the electronic device to a wireless charging circuit while power is transferred to the external device through the conductive coil, and adjusting the power transferred to the external device through the conductive coil, based on a part of a power amount preset in a signal requesting addition of power based on a value of the current being between a first threshold value and a second threshold value greater than the first threshold value.

According to various example embodiments, the method of transferring wireless power may further include adjusting the power transferred to the external device through the conductive coil based on whole of the power amount when the signal is received in a state in which the value of the current is less than the first threshold value.

According to various example embodiments, the method of transferring wireless power may further include maintaining the power transferred to the external device regardless of the signal requesting addition of power based on the signal being received in a state in which the value of the current exceeds the second threshold value.

According to various example embodiments, the method of transferring wireless power may further include detecting connection of an external power source, and changing a maximum allowable value based on the external power source being connected.

According to various example embodiments, the method of transferring wireless power may further include increasing a voltage applied to the wireless charging circuit from the power management circuit in a stepwise manner, and decreasing the maximum allowable value in a stepwise manner based on an increase in the voltage.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The electronic device according to the embodiments disclosed herein may measure an input current and supply power in various ways according to the input current, thereby supporting stable device-to-device wireless charging.

The electronic device according to the embodiments disclosed herein may adjust a charge power state in a stepwise manner before the charging current flowing from an internal power management circuit (e.g., PMIC) to a wireless charging circuit (e.g., MFC IC) reaches a maximum allowable current value, thus stably supporting device-to-device wireless charging.

The electronic device according to the embodiments disclosed herein can stably support device-to-device wireless charging even in an miss-aligned state or even when an outer case of the first electronic device or the second electronic device is relatively thick.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. A mobile communication device comprising:
a display including at least a portion that is viewable at a first surface of the mobile communication device;
a conductive coil disposed between the display and a second surface opposite the first surface, in the mobile communication device;
a wireless charging circuit electrically connected to the conductive coil;
a power management circuit electrically connected to the wireless charging circuit;
a battery electrically connected to the power management circuit; and
a processor operatively connected to the display and the power management circuit,
wherein the processor is configured to control the mobile communication device to:
receive a signal requesting addition of power from the external mobile communication device,
determine a current corresponding to the signal, and
adjust the power to be transferred to the external mobile communication device through the conductive coil by at least comparing the current to a first threshold and a second threshold value greater than the first threshold value,
control the mobile communication device to transmit a response signal requesting the external mobile communication device to stop transmission of the signal or increase a transmission period based on the value of the current being between the first threshold value and the second threshold value.

2. The mobile communication device of claim 1, wherein the first threshold value and the second threshold value are to be determined based on a maximum allowable value of the current flowing to the wireless charging circuit from the power management circuit, the maximum allowable value of the current flowing to the wireless charging circuit from the power management circuit being set in the power management circuit, and
wherein the maximum allowable value is to be set in the power management circuit.

3. The mobile communication device of claim 2, wherein the processor is configured to control the mobile communication device to:
receive first identification information from the external mobile communication device through the conductive coil before the power is transferred to the external mobile communication device, and
set the maximum allowable value based on the first identification information.

4. The mobile communication device of claim 3, wherein the first identification information includes information on a power management circuit included in the external mobile communication device.

5. The mobile communication device of claim 2, wherein the processor is configured to control the mobile communication device to:
receive second identification information from the external mobile communication device through the conductive coil after the power starts to be transferred to the external mobile communication device, and
set the maximum allowable value based on the second identification information.

6. The mobile communication device of claim 5, wherein the second identification information includes unique device information of the external mobile communication device.

7. The mobile communication device of claim 1, wherein the processor is configured to control the mobile communication device to adjust the power transferred to the external mobile communication device through the conductive coil based on a whole of a power amount preset in the signal, when the signal is received in a first state in which a value of the current is less than the first threshold value.

8. The mobile communication device of claim 1, wherein the processor is configured to control the mobile communication device to maintain power transferred to the external mobile communication device regardless of the signal when the signal is received in a second state in which a value of the current exceeds the second threshold value.

9. A mobile communication device comprising:
a display including at least a portion that is viewable at a first surface of the mobile communication device;
a conductive coil disposed between the display and a second surface opposite the first surface, in the mobile communication device;
a wireless charging circuit electrically connected to the conductive coil;
a power management circuit electrically connected to the wireless charging circuit;
a battery electrically connected to the power management circuit; and
a processor operatively connected to the display and the power management circuit,
wherein the processor is configured to control the mobile communication device to:
measure a current flowing from the power management circuit to the wireless charging circuit while power is transferred to an external mobile communication device through the conductive coil,
receive a signal requesting addition of power from the external mobile communication device,
adjust the power to be transferred to the external mobile communication device through the conductive coil by at least comparing the current to a first threshold and a second threshold value greater than the first threshold value,
wherein the first threshold value and the second threshold value are determined based on a maximum allowable value of the current flowing to the wireless charging circuit from the power management circuit, the maximum allowable value of the current flowing to the wireless charging circuit from the power management circuit being set in the power management circuit, wherein the processor is configured to control the mobile communication device to:
- detect connection of an external power source to the power management circuit, and
- change the maximum allowable value based on the external power source being connected.

10. The mobile communication device of claim 1, wherein the processor comprises a micro controller unit (MCU) in the wireless charging circuit.

11. The mobile communication device of claim 1, wherein the processor is configured to control the mobile communication device to adjust the power transferred to the external mobile communication device through the conductive coil in a stepwise manner reflecting, at each stage, only a part of a power amount preset in the signal, when the signal is received in a third state in which a value of the current being between the first threshold value and the second threshold value.

12. The mobile communication device of claim 9, wherein the processor is configured to control the mobile communication device to transmit a response signal requesting the external mobile communication device to stop transmission of the signal or increase a transmission period based on the value of the current being between the first threshold value and the second threshold value.

13. The mobile communication device of claim 9, wherein the processor is configured to control the mobile communication device to maintain the maximum allowable value based on the external mobile communication device being a first specified type of device.

14. The mobile communication device of claim 9, wherein the processor is configured to control the mobile communication device to:
- based on the external mobile communication device being a second specified type of device,
- increase a voltage applied to the wireless charging circuit from the power management circuit in a stepwise manner, and
- decrease the maximum allowable value in a stepwise manner based on an increase in the voltage.

15. The mobile communication device of claim 14, wherein the processor is configured to control the mobile communication device to determine change amounts in the voltage and the maximum allowable value based on an output voltage of the external power source.

* * * * *